(12) United States Patent
Tanabe et al.

(10) Patent No.: US 9,027,716 B2
(45) Date of Patent: May 12, 2015

(54) DISK BRAKE

(75) Inventors: Seiko Tanabe, Yamanashi (JP); Yoichi Kumemura, Yokohama (JP); Hayuru Inoue, Yokohama (JP); Hitoshi Yoshida, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/537,620

(22) Filed: Jun. 29, 2012

(65) Prior Publication Data

US 2013/0001025 A1    Jan. 3, 2013

(30) Foreign Application Priority Data

Jun. 30, 2011   (JP) ................. 2011-146793

(51) Int. Cl.
| | |
|---|---|
| *F16D 65/38* | (2006.01) |
| *F16D 55/226* | (2006.01) |
| *F16D 65/02* | (2006.01) |
| *F16D 65/18* | (2006.01) |
| *F16D 65/00* | (2006.01) |
| *F16D 65/097* | (2006.01) |
| *F16D 121/04* | (2012.01) |

(52) U.S. Cl.
CPC .............. *F16D 55/226* (2013.01); *F16D 65/02* (2013.01); *F16D 65/18* (2013.01); *F16D 65/0006* (2013.01); *F16D 65/0971* (2013.01); *F16D 2121/04* (2013.01)

(58) Field of Classification Search
CPC .......................... F16D 65/0971; F16D 65/0979
USPC .......... 188/73.1, 73.35, 73.36, 73.37, 250 B, 188/250 E, 72.1, 72.4
See application file for complete search history.

(56) References Cited

U.S. PATENT DOCUMENTS

| | | | | |
|---|---|---|---|---|
| 3,890,884 | A * | 6/1975 | Silberschlag ................. | 188/72.4 |
| 5,366,047 | A * | 11/1994 | Beck et al. .................. | 188/73.37 |
| 6,308,807 | B1 * | 10/2001 | Matsumoto et al. ........ | 188/73.38 |
| 8,205,724 | B2 * | 6/2012 | Osawa et al. ................ | 188/72.4 |

FOREIGN PATENT DOCUMENTS

| | | | |
|---|---|---|---|
| EP | 595704 B1 | * | 11/1995 |
| JP | 2010-175040 | | 8/2010 |

* cited by examiner

*Primary Examiner* — Thomas J Williams
(74) *Attorney, Agent, or Firm* — Wenderoth, Lind & Ponack, L.L.P.

(57) ABSTRACT

A pressing part is provided at a disk-circumferentially central portion of a base plate member of a shim plate. The pressing part presses a friction pad at the center in the disk circumferential direction of the friction pad when a piston starts to press the friction pad. The pressing part is formed by slitting and raising the disk-circumferentially central portion of the shim plate along the disk radial direction. When the pressing force of the piston is in a low pressure range, the pressing force is transmitted to the friction pad through the pressing part. After the pressing force of the piston has exceeded the low pressure range, the pressing force is transmitted to the friction pad through the whole region in the disk circumferential direction of the piston.

13 Claims, 13 Drawing Sheets

＃ DISK BRAKE

BACKGROUND OF THE INVENTION

The present invention relates to disk brakes that apply braking force to a vehicle, for example, an automobile.

In general, a disk brake provided in a vehicle, e.g. an automobile, has a caliper disposed to extend over the outer periphery of a disk in the axial direction of the disk, the disk being rotatable relative to a stationary part of a vehicle, a piston provided at at least one side of the caliper in the axial direction of the disk, and a pair of friction pads that are pressed against both sides of the disk by the piston (for example, see Japanese Patent Application Publication No. 2010-175040).

When the driver of the vehicle, for example, performs a braking operation, the piston is slidingly displaced toward the disk by a hydraulic pressure supplied externally, for example, so that the piston presses the friction pads toward the disk, thereby applying braking force to the disk.

It is desirable for disk brakes to be capable of suppressing brake noise throughout the time from when the friction pads are brand-new until the time to replace them with new ones, for example. It is particularly desirable for disk brakes to be capable of stably suppressing brake noise known as "low pressure brake noise" occurring when the driver places his or her foot on the brake pedal just lightly, i.e. during braking in a low pressure range at which the friction pads start to contact the disk.

SUMMARY OF THE INVENTION

An object of the present invention is to provide a disk brake capable of suppressing brake noise during braking in the low pressure range.

To solve the above-described problem, the present invention is applied to a disk brake having a caliper disposed to extend over the outer periphery of a disk in a disk axial direction, the disk being rotatable relative to a stationary part of a vehicle, a piston provided at at least one side of the caliper in the disk axial direction, and a pair of friction pads that are pressed against both sides of the disk by the piston.

The present invention features a structure having a pressing mechanism provided between the piston and one of the friction pads that is disposed between the piston and the disk. The pressing mechanism presses the friction pad at the center in a disk circumferential direction of the piston when the piston starts to press the friction pad. When the pressing force of the piston is in a low pressure range, the pressing force of the piston is transmitted to the friction pad through the pressing mechanism. After the pressing force of the piston exceeded the low pressure range, the pressing force of the piston is transmitted to the friction pad through the whole region in the disk circumferential direction of the piston.

It is possible according to the present invention to suppress brake noise during braking in the low pressure range.

PREFERRED EMBODIMENT OF THE INVENTION

Figure 1:
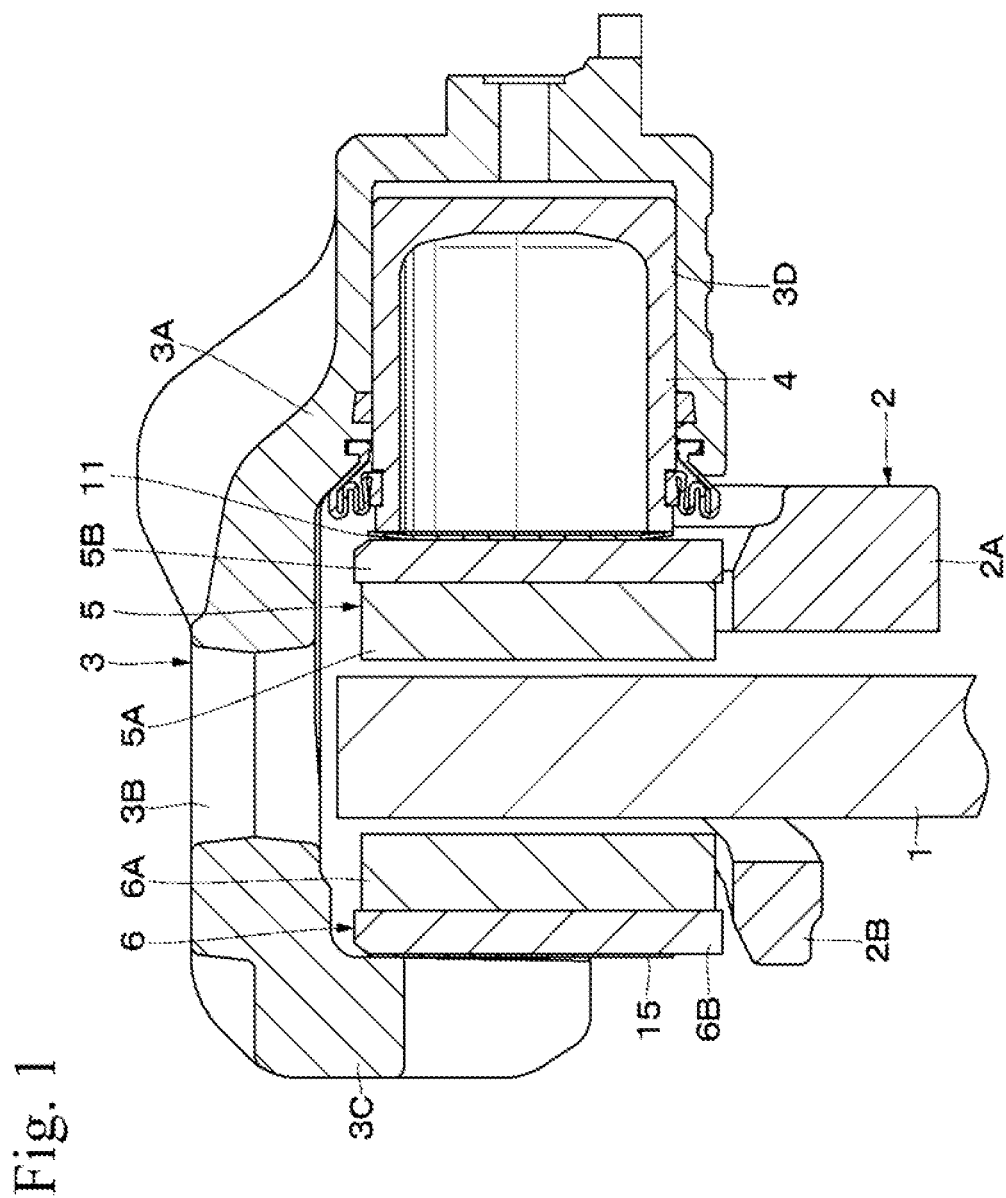
FIG. 1 is a vertical sectional view of a disk brake according to a first embodiment of the present invention.

Disk brakes according to embodiments of the present invention will be explained below in detail with reference to the accompanying drawings.

FIGS. 1 to 6 show a first embodiment of the present invention. In the figures, a disk 1 is rotatable relative to a stationary part (e.g. a mounting member 2, described later) of a vehicle. The disk 1 rotates together with a wheel (not shown).

A mounting member 2, which is known as a carrier, is secured to a non-rotating part of the vehicle at a position near the disk 1. The mounting member 2 substantially comprises a pair of arm portions (not shown), a thick-walled support portion 2A, and a reinforcing beam 2B. The arm portions are spaced apart from each other in the rotational direction of the disk 1 (referred to as "the disk circumferential direction" in this application) and extend over the outer periphery of the disk 1 in the axial direction of the disk 1 (in the horizontal direction in FIG. 1, referred to as "the disk axial direction" in this application). The support portion 2A connects together the proximal ends of the arm portions into an integral structure and is secured to the non-rotating part of the vehicle at the inner side of the disk 1. The reinforcing beam 2B extends in the disk circumferential direction and connects together the distal ends of the arm portions at the outer side of the disk 1.

The arm portions support a caliper 3 (described later) through sliding pins (not shown) so that the caliper 3 is slidable in the disk axial direction. The inner side of the mounting member 2 is provided with a pair of pad guides (not shown) that guide an inner friction pad 5 (described later) in the disk axial direction. The pad guides are each formed as a U-groove of substantially U-shaped sectional configuration extending in the disk axial direction. The pair of pad guides are spaced from each other in the disk circumferential direction and disposed at one side and the other side, respectively, of the disk 1 in the disk circumferential direction so as to face each other across the friction pad 5. The pad guides are fitted with lug portions 5C and 5D of the friction pad 5 through, for example, pad springs (not shown), respectively.

The outer side of the mounting member 2 is also provided with a pair of pad guides (not shown) that guide an outer friction pad 6 (described later) in the disk axial direction. These pad guides are arranged in the same way as the inner pad guides. That is, the pad guides are each formed as a U-groove of substantially U-shaped sectional configuration extending in the disk axial direction. The pair of pad guides are spaced from each other in the disk circumferential direction and disposed at one side and the other side, respectively, in the disk circumferential direction of the disk 1 so as to face each other across the friction pad 6. The pad guides are fitted with lug portions 6C and 6D (for example, see FIGS. 11 and 12, described later) of the friction pad 6 through, for example, pad springs (not shown), respectively.

The mounting member 2 has a caliper 3 provided thereon slidably in the disk axial direction. The caliper 3 is disposed to extend over the outer periphery of the disk 1 in the disk axial direction. The caliper 3 comprises an inner leg portion 3A provided at the inner side of the disk 1, a bridge portion 3B extending from the inner leg portion 3A to the outer side of the disk 1 over the outer periphery of the disk 1 between the arm portions of the mounting member 2, and an outer leg portion 3C extending from the outer, or distal, end of the bridge portion 3B inward in the radial direction of the disk 1 (referred to as "the disk radial direction" in this application) and having a forked claw portion at the distal end thereof.

The inner leg portion 3A of the caliper 3 is provided with a cylinder 3D supplied with a brake fluid pressure from the outside during a braking operation. The cylinder 3D has a piston 4 (described later) slidably fitted therein. In addition, the inner leg portion 3A is integrally provided with a pair of pin-mounting portions (not shown) projecting in the disk circumferential direction. The pin-mounting portions allow the whole caliper 3 to be slidably supported by the arm portions of the mounting member 2 through sliding pins.

The outer leg portion 3C of the caliper 3 abuts against an outer friction pad 6 (described later) through a shim plate 15. During a braking operation, the outer leg portion 3C presses the inner and outer friction pads 5 and 6 toward both sides of the disk 1 in cooperation with the piston 4.

A piston 4 is provided in the inner leg portion 3A of the caliper 3, which is at one side of the caliper 3 in the disk axial direction. The piston 4 is formed in the shape of a tubular member, one end of which is closed, and slidably fitted in the cylinder 3D of the inner leg portion 3A. When a brake fluid pressure is externally supplied into the cylinder 3D of the inner leg portion 3A, the piston 4 is slidingly displaced toward the disk 1 in the disk axial direction by the fluid pressure, thereby pressing the inner friction pad 5 (described later) against one side of the disk 1.

In this case, the piston 4 has its opening end (distal end) abutting against the inner friction pad 5 through a shim plate 11 (described later). When the brake of the vehicle is activated, the piston 4 presses the friction pad 5 toward the obverse side of the disk 1 with the opening end thereof abutting against the shim plate 11.

The inner and outer friction pads 5 and 6 are disposed at the opposite sides, respectively, of the disk 1 to face each other across the disk 1 in the disk axial direction. The inner and outer friction pads 5 and 6 are formed as plate-shaped members extending in the disk circumferential direction. The pair of friction pads 5 and 6 are pressed against both sides (two axially opposite sides) of the disk 1 by the piston 4.

Figure 2:
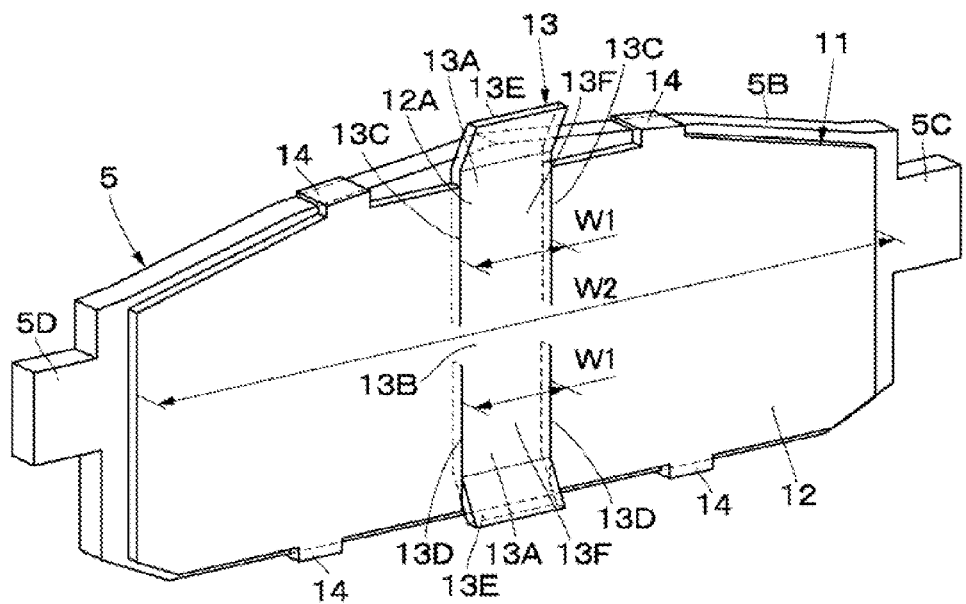
FIG. 2 is a perspective view of an inner friction pad and a shim plate as seen from the inner side (right-hand side in FIG. 1).
Figure 3:
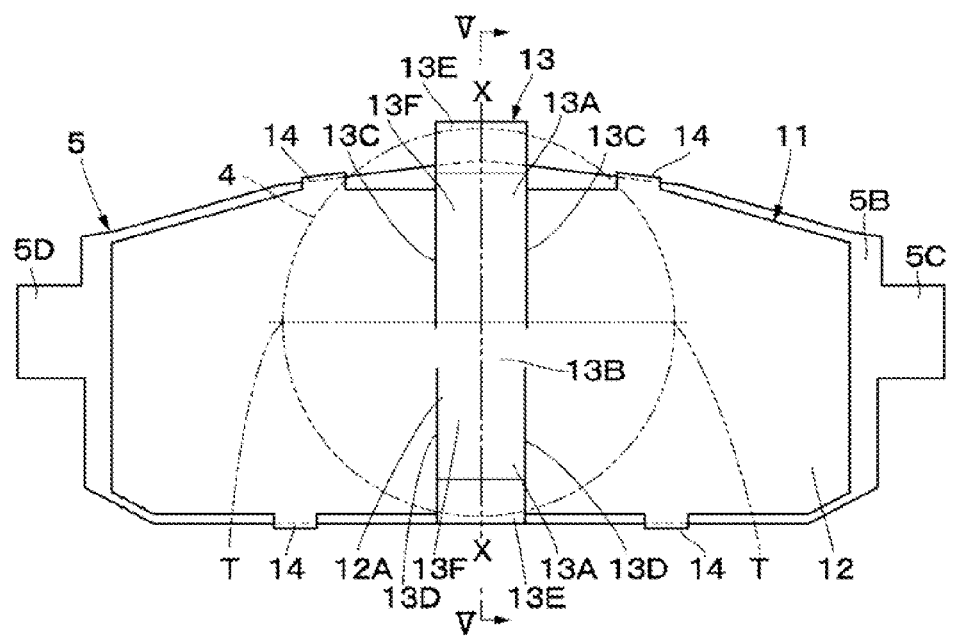
FIG. 3 is a front view of the inner friction pad and the shim plate as seen from the inner side.
Figure 4:
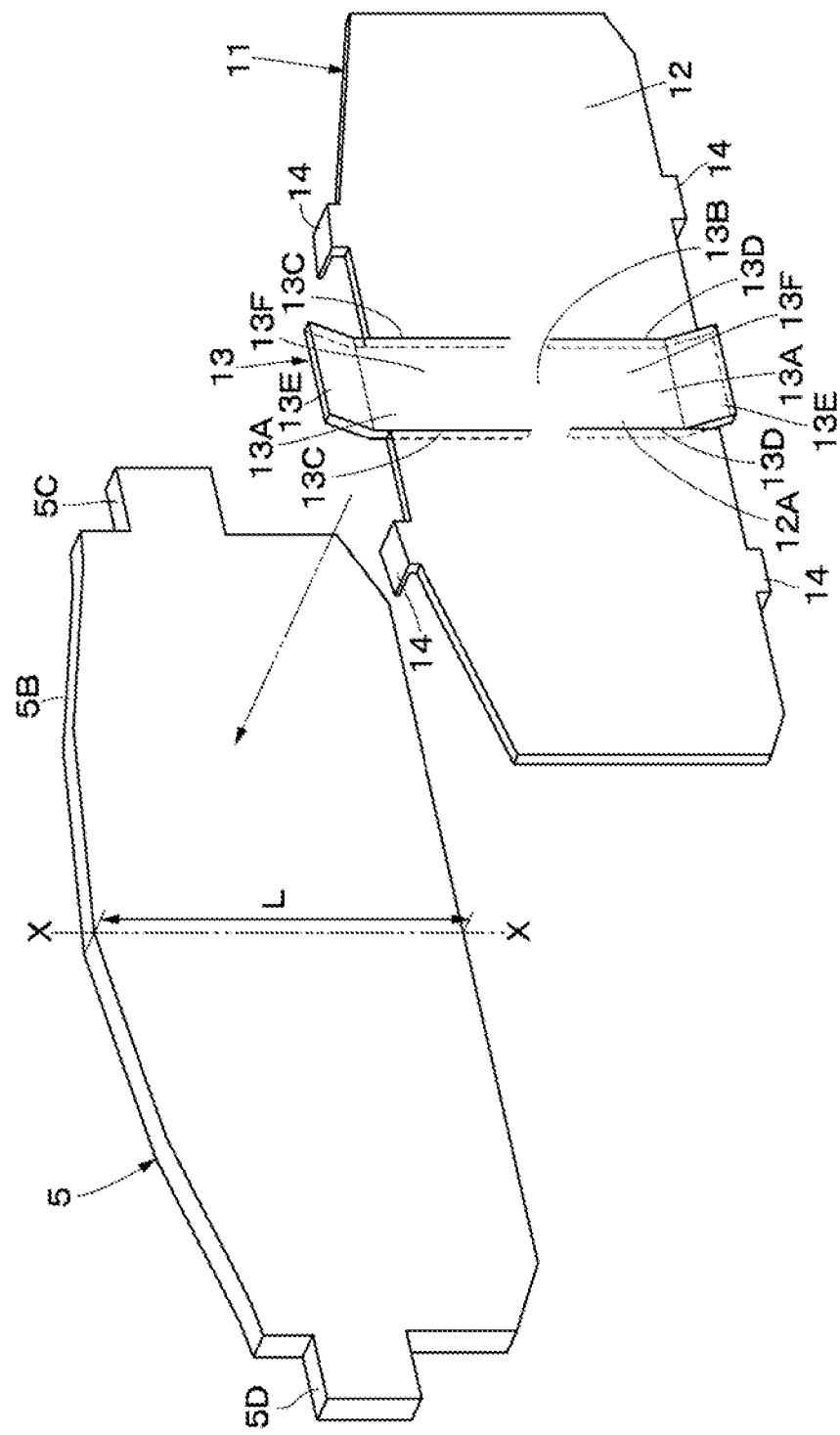
FIG. 4 is an exploded perspective view of the inner friction pad and the shim plate shown in FIG. 2.

The inner friction pad 5 comprises a lining 5A as a friction member that comes in frictional contact with the obverse side (axial side) of the disk 1, and a backing plate 5B fixed (joined) to the back surface of the lining 5A. The backing plate 5B is molded of a metal or a synthetic resin, for example. The backing plate 5B has, as shown in FIGS. 2 and 3, rectangular lug portions 5C and 5D spaced from each other in the disk circumferential direction.

The lug portions 5C and 5D are fitted in the inner pad guides of the mounting member 2 through pad springs (not shown), respectively. The lug portions 5C and 5D are supported slidably in the disk axial direction by the pad guides and the pad springs. The lug portions 5C and 5D transmit braking torque that the friction pad 5 receives from the disk 1 during braking of the vehicle to the mounting member 2 through abutting contact with the pad guides.

The outer friction pad 6 comprises a lining 6A and a backing plate 6B in the same way as the inner friction pad 5. That is, the backing plate 6B has rectangular lug portions 6C and 6D (for example, see FIGS. 11 and 12) provided on the opposite ends in the disk circumferential direction thereof. The lug portions 6C and 6D of the outer friction pad 6 are arranged in the same way as the lug portions 5C and 5D of the inner friction pad 5. That is, the lug portions 6C and 6D are fitted in the outer pad guides of the mounting member 2 through pad springs (not shown), respectively. The lug portions 6C and 6D are supported slidably in the disk axial direction by the pad guides and the pad springs. The lug portions 6C and 6D of the outer friction pad 6 also transmit braking torque that the friction pad 6 receives from the disk 1 during braking of the vehicle to the mounting member 2 through abutting contact with the pad guides.

The following is an explanation of the inner shim plate 11 provided between the inner friction pad 5 and the piston 4.

The inner shim plate 11 is disposed between the piston 4 fitted in the inner leg portion 3A of the caliper 3 and the backing plate 5B of the inner friction pad 5 to prevent generation of brake noise between the piston 4 and the friction pad 5. The shim plate 11 is formed as a one-piece member, for example, by applying press working to a resilient stainless steel plate or the like having a smaller wall thickness than the backing plate 5B, and as shown in FIG. 2, detachably attached to the rear side (piston 4 side) of the inner friction pad 5 (backing plate 5B).

The shim plate 11 substantially comprises a base plate member 12 (described later) and mounting claw portions 14. The base plate member 12 is formed as a plate-shaped member having a substantially rectangular or substantially sectorial configuration as a whole, which extends in both the disk circumferential direction and the disk radial direction along the rear side of the friction pad 5 (backing plate 5B). The base plate member 12 has a central portion 12A in the middle in the disk circumferential direction thereof. The central portion 12A projects from the base plate member 12 both outward and inward in the disk radial direction. The disk-circumferentially central portion 12A of the base plate member 12 (i.e. the central portion 12A in the disk circumferential direction of the base plate member 12) is provided with a pressing part 13 extending in the disk radial direction.

The pressing part 13 is provided as an integral part of the shim plate 11 (base plate member 12) in the disk-circumferentially central portion 12A of the shim plate 11. The pressing part 13 is positioned between the piston 4 and the friction pad 5 when the friction pad 5 is attached to the mounting member 2, together with the shim plate 11.

The pressing part 13 is formed by slitting and raising the disk-circumferentially central portion 12A of the shim plate 11 along the disk radial direction. More specifically, the pressing part 13 comprises a pair of slit-and-raised portions 13A spaced from each other in the disk radial direction, and a connecting portion 13B located between the slit-and-raised portions 13A to connect therebetween.

For the purpose of the above, the shim plate 11 (base plate member 12) has slits 13C and 13D formed in the disk-circumferentially central portion 12A at respective positions facing each other across a line segment X-X extending in the disk radial direction such that the slits 13C and 13D extend along the disk radial direction, with the radially central portion of the shim plate 11 left unslit. In other words, the disk-circumferentially central portion 12A of the shim plate 11 has a pair of mutually parallel slits 13C formed in the outward end edge in the disk radial direction thereof such that the slits 13C face each other across the line segment X-X and extend inward in the disk radial direction. In addition, a pair of mutually parallel slits 13D are formed in the inward end edge in the disk radial direction of the disk-circumferentially central portion 12A of the shim plate 11 such that the slits 13D face each other across the line segment X-X and extend radially outward in the disk radial direction.

Regions sandwiched between the slits 13C and 13D define slit-and-raised portions 13A, respectively. The slit-and-raised portions 13A have projections 13E provided at the distal ends thereof, which are formed by bending (raising) the distal end portions of the slit-and-raised portions 13A toward the piston 4. The projections 13E serve as regions that are pressed by the opening end of the piston 4 before the whole opening end (distal end) of the piston 4 abuts against the shim plate 11. It should be noted that, as shown in FIG. 2, the width W1 of the slit-and-raised portions 13A (spacing W1 between each pair of slits 13C and 13D) is set at not more than ½ (preferably not more than ⅕, more preferably not less than 1/12 but not more than 1/17) of the width W2 of the shim plate 11 in the circumferential direction of the disk 1 (W1≤W2/2).

The pressing part 13 presses the center in the disk circumferential direction of the friction pad 5 when the piston 4 starts to press the friction pad 5, that is, when the brakes are applied to an extent at which the friction pads 5 and 6 start to contact the disk 1, for example, during braking in a low pressure range reached when the driver places his or her foot on the brake pedal just lightly, more specifically, in a pressure range in which the pressing force F of the piston 4 is very low, e.g. not more than 0.8 MPa, more preferably not more than 0.5 MPa, in terms of fluid pressure.

Figure 5:
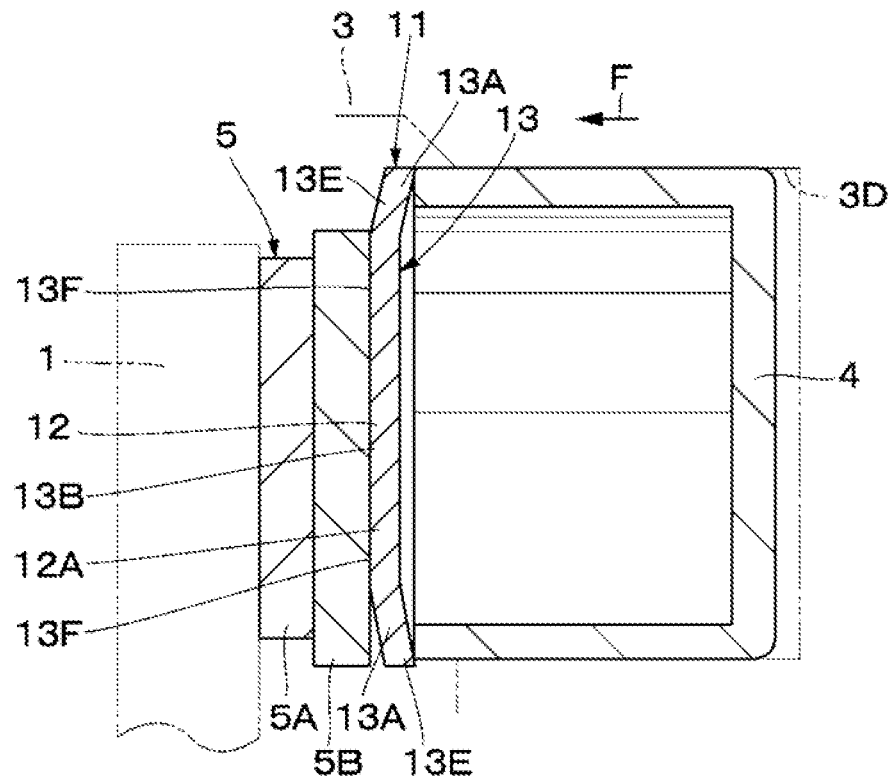
FIG. 5 is a sectional view as seen from the direction of the arrow V-V in FIG. 3, showing a piston, a friction pad, and a shim plate when the pressing force of the piston is in a low pressure range.

That is, as shown in FIG. 5, when the pressing force F of the piston 4 is in the low pressure range, only the projections 13E of the slit-and-raised portions 13A are pressed by the opening end of the piston 4. At this time, backing plate abutting portions 13F of the slit-and-raised portions 13A, which are regions closer to the proximal ends of the slit-and-raised portions 13A than the projections 13E, and the connecting portion 13B between the backing plate abutting portions 13F press the disk-circumferential center of the friction pad 5 with a predetermined length along the line segment X-X in the disk radial direction. The whole pressing part 13 constitutes a pressing mechanism in the present invention that presses the friction pad at the center in the disk circumferential direction of the piston when the piston starts to press the friction pad.

It should be noted that the above-mentioned "predetermined length" may be set at not less than ⅓ (preferably not less than ½, more preferably not less than ¾) of the length L (see FIG. 4) in the disk radial direction of the backing plate 5B at the center in the disk circumferential direction thereof, for example. In other words, the above-mentioned "predetermined length" may be set at an appropriate length according to the size of the friction pad 5, the required brake performance, etc. so that low pressure brake noise can be suppressed stably, for example.

Figure 6:
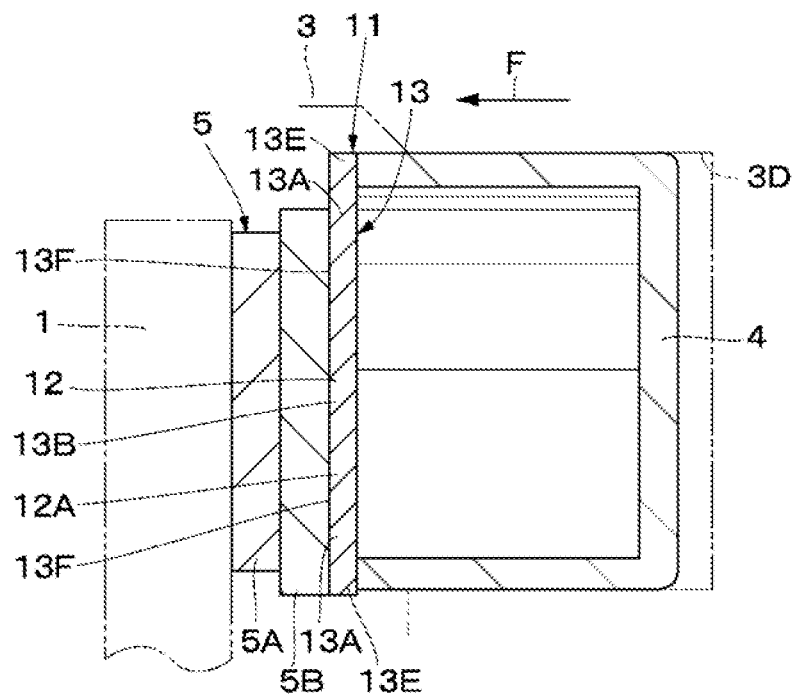
FIG. 6 is a sectional view similar to FIG. 5, showing the piston, the friction pad, and the shim plate after the pressing force of the piston has exceeded the low pressure range.

When the pressing force F of the piston 4 is in the low pressure range, the projections 13E are elastically deformed toward the friction pad 5 as the pressing force F of the piston 4 increases. After the pressing force F of the piston 4 has exceeded the low pressure range, as shown in FIG. 6, the projections 13E are most deflected toward the friction pad 5 (most deflected state). Consequently, the projections 13E, the backing plate abutting portions 13F and the connecting portion 13B become flush with each other. Thus, after the low pressure range has been exceeded, the whole of a region of the opening end of the piston 4 that faces the shim plate 11 in the axial direction of the disk 1 abuts against the shim plate 11 to press the friction pad 5 with the whole piston 4.

Consequently, when the pressing force F of the piston 4 is in the low pressure range, the pressing force F is transmitted to the friction pad 5 through the pressing part 13 (pressing mechanism) at the center in the disk circumferential direction of the piston 4. After the pressing force F has exceeded the low pressure range, however, the range in the disk circumferential direction that transmits force to the friction pad 5 extends to the opposite ends T in the disk circumferential direction of the piston 4. Accordingly, the whole region in the disk circumferential direction of the opening end of the piston 4 transmits force to the friction pad 5.

Thus, when the pressing force F of the piston 4 is in the low pressure range, the pressing force F of the piston 4 is transmitted to the friction pad 5 through the pressing part (pressing mechanism) 13 at the center in the disk circumferential direction of the piston 4. After the pressing force F has exceeded the low pressure range, however, the range in the disk circumferential direction that transmits force to the friction pad 5 extends to the opposite ends T in the disk circumferential direction of the piston 4. Accordingly, the pressing force F of the piston 4 can be transmitted to the friction pad 5 through the whole region in the disk circumferential direction of the opening end of the piston 4 (i.e. the whole of a region of the opening end of the piston 4 that faces the shim plate 11 in the axial direction of the disk 1).

When the pressing force F of the piston 4 is in the low pressure range, a region of the friction pad 5 at the center in the disk circumferential direction thereof that extends along the line segment X-X in the disk radial direction is pressed by the pressing part 13. It should be noted that the line segment X-X corresponds to the node of axial primary bending moment of the friction pad 5, which is a vibration mode characteristic of brake noise during braking in the low pressure range, i.e. what is called low pressure brake noise. When the pressing force F is in the low pressure range, the friction pad 5 is pressed by the piston 4 through the pressing part 13 at a region along the line segment X-X corresponding to the node. In other words, the pressing force F of the piston 4 is transmitted to the friction pad 5 through only the region along the line segment X-X corresponding to the node of vibration of the friction pad 5. Accordingly, it is possible to reduce vibration of the friction pad 5 that is transmitted to the caliper 3 through the piston 4 during braking in the low pressure range and hence possible to suppress low pressure brake noise stably.

The shim plate 11 (base plate member 12) has mounting claw portions 14 provided at four positions on the peripheral edge thereof so that the mounting claw portions 14 project from the peripheral edge. The mounting claw portions 14 are used to attach the shim plate 11 to the backing plate 5B of the friction pad 5. Although in this embodiment a total of four mounting claw portions 14 are provided, i.e. two mounting claw portions 14 on the disk-radially outer edge of the base plate member 12 and two mounting claw portions 14 on the disk-radially inner edge of the base plate member 12, the present invention is not limited thereto. The number of mounting claw portions 14 may be at least two, provided that at least one mounting claw portion 14 is provided on each of the disk-radially outer and inner edges of the base plate member 12.

The following is an explanation of an outer shim plate 15 (see FIG. 1) provided between the outer friction pad 6 and the outer leg portion 3C of the caliper 3.

The outer shim plate 15 is disposed between the outer leg portion 3C of the caliper 3 and the backing plate 6B of the outer friction pad 6 to prevent generation of brake noise between the outer leg portion 3C and the friction pad 6. The shim plate 15 is formed as a one-piece member, for example, by applying press working to a resilient stainless steel plate or the like having a smaller wall thickness than the backing plate 6B, and detachably attached to the rear side (side remote from the lining GA) of the outer friction pad 6 (backing plate 6B).

The outer shim plate 15 is formed as a flat plate having a substantially rectangular or substantially sectorial configuration, which extends in both the disk circumferential direction and the disk radial direction along the rear side of the friction pad 6 (backing plate 6B). In this embodiment, the outer shim plate 15 is not provided with a pressing part 13 as provided for the above-described inner shim plate 11.

The outer shim plate 15 prevents the outer leg portion 3C of the caliper 3 and the backing plate 6B of the inner friction pad 6 from directly contacting each other, thereby suppressing the generation of brake noise between the outer leg portion 3C and the backing plate 6B. It should be noted that the outer shim plate 15 may be provided with a pressing part as in other embodiments described later (e.g. third embodiment).

The following is an explanation of the operation of the disk brake according to this embodiment arranged as stated above.

When the brake of the vehicle is activated, a brake fluid pressure is supplied into the cylinder 3D of the caliper 3, causing the piston 4 to be slidingly displaced toward the disk 1, whereby the inner friction pad 5 is pressed against one side of the disk 1. At this time, the caliper 3 receives pressing counterforce from the disk 1. Therefore, the whole caliper 3 is slidingly displaced toward the inner side relative to the arm portions of the mounting member 2. Consequently, the outer leg portion 3C presses the outer friction pad 6 against the other side of the disk 1.

Thus, the inner and outer friction pads 5 and 6 can strongly hold the disk 1, rotating together with the wheel, therebetween from both sides in the disk axial direction, thereby applying braking force to the disk 1. When the braking operation is canceled, the supply of the fluid pressure to the piston 4 is stopped. Consequently, the inner and outer friction pads 5 and 6 separate from the disk 1 and return to their non-braking positions.

During the above-described braking operation, when the pressing force F of the piston 4 is in a low pressure range, e.g. a pressure range of not more than 0.8 MPa, more preferably not more than 0.5 MPa, in terms of fluid pressure, as shown in FIG. 5, only the slit-and-raised portions 13A (projections 13E) of the inner shim plate 11 are pressed by the opening end of the piston 4. At this time, the backing plate abutting portions 13F and the connecting portion 13B of the slit-and-raised portions 13A press the center in the disk circumferential direction of the friction pad 5 along the line segment X-X in the disk radial direction.

The line segment X-X corresponds to the node of axial primary bending moment of the friction pad 5, which is a vibration mode characteristic of low pressure brake noise. When the pressing force F of the piston 4 is in the low pressure range, a region of the friction pad 5 along the line segment X-X corresponding to the node is pressed by the piston 4 through the pressing part 13. Accordingly, it is possible to reduce vibration of the friction pad 5 that is transmitted to the caliper 3 through the piston 4 during braking in the low pressure range and hence possible to suppress low pressure brake noise stably.

After the pressing force F of the piston 4 has exceeded the low pressure range, as shown in FIG. 6, the projections 13E of the slit-and-raised portions 13A are most deflected toward the friction pad 5. Consequently, the projections 13E, the backing plate abutting portions 13F and the connecting portion 13B become flush with each other. Thus, after the low pressure range has been exceeded, the whole opening end of the piston 4 (whole of a region of the opening end of the piston 4 that faces the shim plate 11 in the disk axial direction) abuts against the shim plate 11 to press the friction pad 5 with the whole piston 4. Thus, the inner and outer friction pads 5 and 6 can strongly hold the disk 1 therebetween from both sides in the disk axial direction with a large force (force exceeding the low pressure range) corresponding to the pressing force F of the piston 4 and hence can apply a strong braking force to the disk 1.

Incidentally, brake noise known as "low pressure brake noise" may occur during braking in a low pressure range in which the pressing force F of the piston 4 is very low, e.g. not more than 0.8 MPa in terms of fluid pressure. A conventional scheme to reduce such low pressure brake noise is to apply grease to the shim plate or to use a shim plate having an elastic material, e.g. rubber, stacked thereon. However, the use of a grease-coated shim plate or a stacked shim plate is likely to increase costs. In addition, it may become impossible to suppress low pressure brake noise sufficiently as the grease or the elastic material deteriorates with time.

The aforementioned Japanese Patent Application Publication No. 2010-175040 discloses a structure in which an urging member is provided in the cylinder of the caliper to urge the piston in the disk circumferential direction, thereby suppressing low pressure brake noise. The related-art structure, however, needs, for example, an operation for assembling the urging member in the cylinder of the caliper and hence may increase costs correspondingly.

In contrast, this embodiment has a structure in which the pressing part 13 is provided between the piston 4 and the inner friction pad 5, which pressing part 13 presses the center in the disk circumferential direction of the friction pad 5 with a predetermined length along the line segment X-X in the disk radial direction. With this structure, when the piston 4 starts to press the friction pad 5, the pressing part 13 transmits the pressing force F of the piston 4 to the friction pad 5.

Accordingly, during braking in a low pressure range in which the pressing force F of the piston 4 is very low, the friction pad 5 is pressed by the pressing part 13 at a region thereof along the line segment X-X corresponding to the node of axial primary bending moment of the friction pad 5, which is a vibration mode characteristic of low pressure brake noise. Accordingly, it is possible to reduce vibration of the friction pad 5 that is transmitted to the caliper 3 through the piston 4 during braking in the low pressure range and hence possible to suppress low pressure brake noise stably.

Moreover, the pressing part 13 can be made less susceptible to the influence of deterioration with time than grease or rubber or other elastic material that would otherwise be stacked on the shim plate. In other words, the pressing part 13 can be made resistant to deterioration with time. Therefore, it is possible to suppress low pressure brake noise stably despite a long time use. In addition, because the pressing part 13 presses a central portion in the disk circumferential direction of the friction pad 5, e.g. a portion of the friction pad 5 along the line segment X-X shown in FIGS. 3 and 4, low pressure brake noise can be suppressed stably throughout the time from when the friction pad 5 is brand-new until the time to replace it with a new one irrespective of how worn the lining 5A of the friction pad 5 is.

According to this embodiment, the pressing part 13 is provided as an integral part of the inner shim plate 11. Accordingly, it is possible to form the pressing part 13 easily by press working, for example, and moreover, at the same time as the process of forming the shim plate 11, for example. Therefore, costs can be reduced as compared to the structure in which the shim plate is coated with grease, or the structure that uses a stacked shim plate.

According to this embodiment, the pressing part 13 is formed by slitting and raising the disk-circumferentially central portion 12A of the shim plate 11 along the disk radial direction. Accordingly, the pressing part 13 can be formed by a simple working process, e.g. press working. Therefore, costs can be reduced also from this point of view.

According to this embodiment, the width W1 of the slit-and-raised portions 13A of the pressing part 13 is set at not more than ½ of the width W2 of the shim plate 11 in the disk circumferential direction. Accordingly, the pressing part 13 can press the central portion in the disk circumferential direction of the friction pad 5 with a predetermined area along the line segment X-X. Therefore, low pressure brake noise can be suppressed stably also from this point of view.

According to this embodiment, the pressing force F of the piston 4 is transmitted to the friction pad 5 through the pressing part 13 (only) when the pressing force F of the piston 4 is in a low pressure range, e.g. a pressure range of not more than 0.8 MPa, more preferably not more than 0.5 MPa, in terms of fluid pressure. Accordingly, low pressure brake noise can be suppressed stably when the brakes are applied to an extent at which the friction pads 5 and 6 start to contact the disk 1, i.e. during braking in a low pressure range reached when the driver places his or her foot on the brake pedal just lightly.

Figure 7:
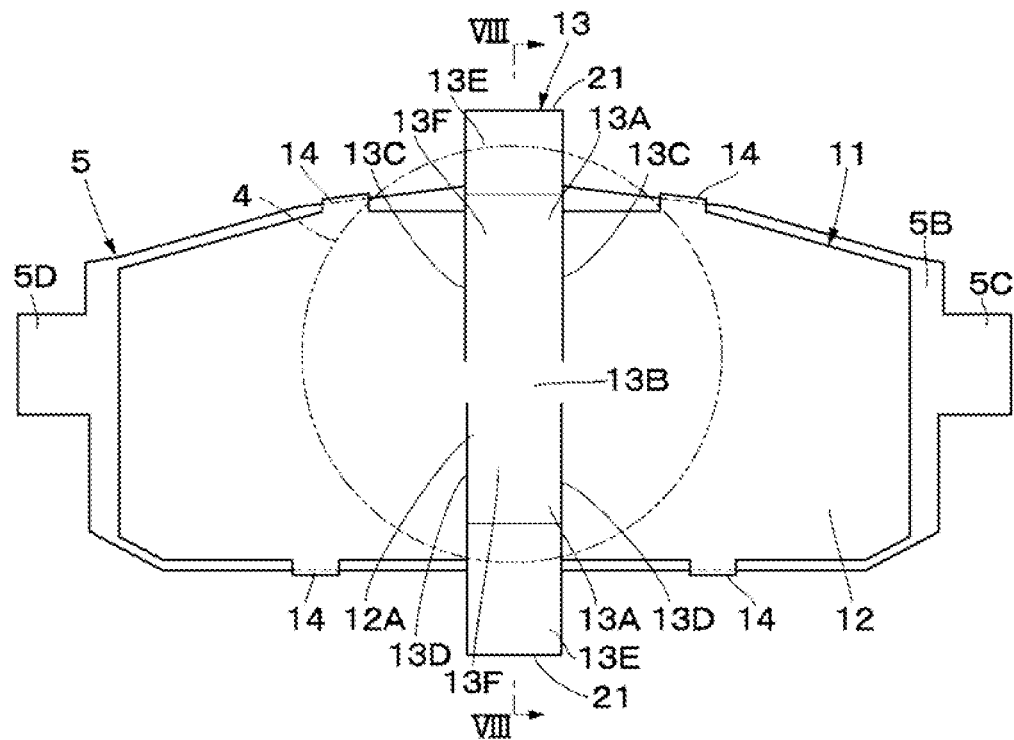
FIG. 7 is a front view similar to FIG. 3, showing an inner friction pad and a shim plate of a disk brake according to a second embodiment of the present invention.
Figure 8:
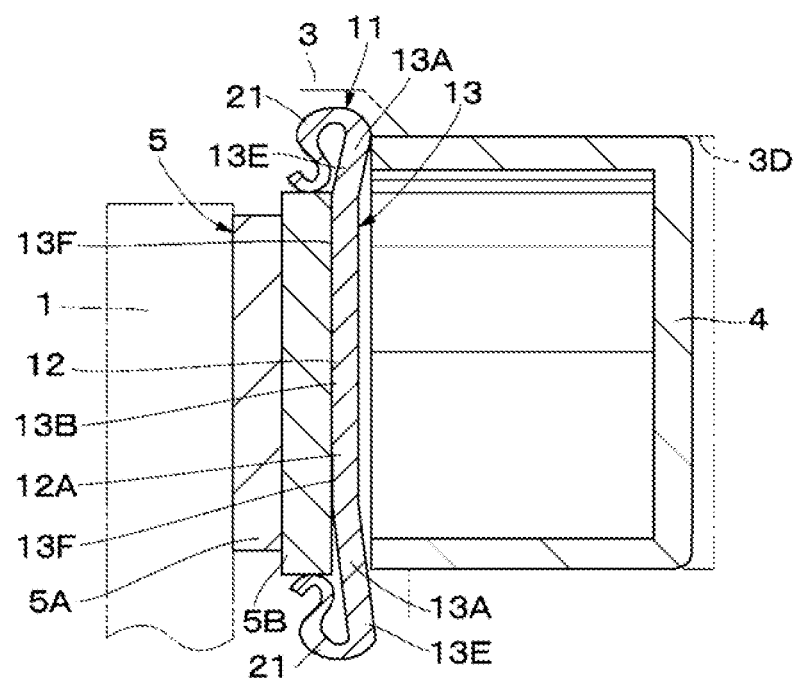
FIG. 8 is a sectional view as seen from the direction of the arrow VIII-VIII in FIG. 7, showing a piston, a friction pad, and a shim plate when the pressing force of the piston is in a low pressure range.

FIGS. 7 and 8 show a second embodiment of the present invention. The feature of this embodiment resides in that elastic contact portions are provided at the respective distal ends of slit-and-raised portions constituting a pressing part so that the elastic contact portions elastically contact a backing plate of a friction pad. It should be noted that, in this embodiment, the same constituent elements as those of the foregoing first embodiment are denoted by the same reference numerals as used in the first embodiment, and a description thereof is omitted.

A pressing part 13 is provided as an integral part of a shim plate 11 (base plate member 12), being located at a disk-circumferentially central portion 12A of the base plate member 12. The pressing part 13 substantially comprises a pair of slit-and-raised portions 13A spaced from each other in the disk radial direction, and a connecting portion 13B located between the slit-and-raised portions 13A to connect therebetween. Each slit-and-raised portion 13A is provided at the distal end thereof with a projection 13E formed by bending (raising) the distal end portion of the slit-and-raised portion 13A toward the piston 4, and a folded portion 21 as an elastic contact portion formed by folding back the distal end of the projection 13E toward the peripheral edge of the backing plate 5B of the friction pad 5 into a substantially S-shape in cross-section. The distal end of the folded portion 21 elastically contacts (engages) the peripheral edge of the backing plate 5B, thereby making it possible to increase the spring constant (elastic force) of the projection 13E, for example.

The disk brake according to this embodiment prevents brake noise by using the shim plate 11 arranged as stated above and has no particular difference in the basic operation from the disk brake according to the foregoing first embodiment.

In the second embodiment, in particular, the folded portion 21 is provided at the distal end of each projection 13E so as to elastically contact the peripheral edge of the backing plate 5B. Therefore, the spring constant of the projection 13E can be increased by the folded portion 21. The folded portion 21 also allows the spring constant of the projection 13E to be set finely. Accordingly, it is possible to stabilize pressing force F applied to the friction pad 5 from the piston 4 through the pressing part 13 during braking in a low pressure range and hence possible to suppress low pressure brake noise even more stably.

FIGS. 9 to 12 show a third embodiment of the present invention. The feature of this embodiment resides in that slit-and-raised portions constituting a pressing part are formed by slitting and raising along the disk circumferential direction, and that a shim plate having a pressing part is also provided between an outer friction pad and an outer leg portion of a caliper. It should be noted that, in this embodiment, the same constituent elements as those of the foregoing first embodiment are denoted by the same reference numerals as used in the first embodiment, and a description thereof is omitted.

Figure 9:
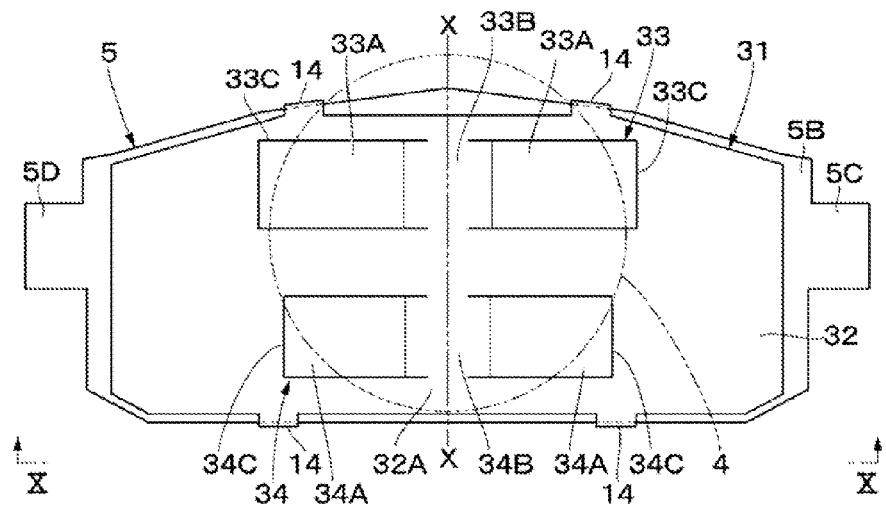
FIG. 9 is a front view similar to FIG. 3, showing an inner friction pad and a shim plate of a disk brake according to a third embodiment of the present invention.
Figure 10:
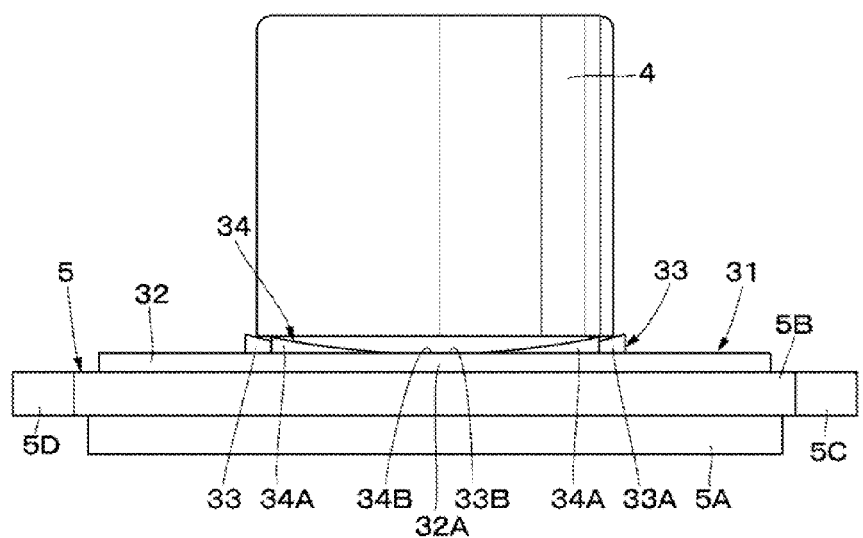
FIG. 10 is a bottom view as seen from the direction of the arrow X-X in FIG. 9, showing a piston, a friction pad, and a shim plate.

An inner shim plate 31 provided between an inner friction pad 5 and a piston 4, as shown in FIGS. 9 and 10, substantially comprises mounting claw portions 14 and a base plate member 32 (described later). The base plate member 32 is formed as a plate-shaped member having a substantially rectangular or substantially sectorial configuration, which extends in both the disk circumferential direction and the disk radial direction along the rear side of the inner friction pad 5 (backing plate 5B). The base plate member 32 is provided with a first pressing part 33 and second pressing part 34 which extend in the disk circumferential direction.

The first and second pressing parts 33 and 34 are provided as integral parts of the shim plate 31 (base plate member 32) in parallel to each other, being spaced in the disk radial direction. The pressing parts 33 and 34 are located between the piston 4 and the friction pad 5 when the friction pad 5 is attached to the mounting member 2, together with the shim plate 31.

The pressing parts 33 and 34 are formed by slitting and raising the base plate member 32, which constitutes the shim plate 31, along the circumferential direction of the disk 1, with a disk-circumferentially central portion 32A of the base plate member 32 left unslit. More specifically, each pressing part 33, 34 substantially comprises a pair of slit-and-raised portions 33A, 34A spaced from each other in the circumferential direction of the disk 1, and a connecting portion 33B, 34B located between the slit-and-raised portions 33A, 34A to connect therebetween.

Accordingly, the upper part of the shim plate 31 (base plate member 32) is slit in a substantially U-shape rightward and leftward from the disk-circumferentially central portion 32A along the circumferential direction of the disk 1, with the central portion 32A left unslit, to form substantially U-shaped slits 33C symmetrically facing each other across the circumferentially central portion 32A. A region enclosed (surrounded) by each slit 33C forms a slit-and-raised portion 33A of the first pressing part 33. As shown in FIG. 10, the slit-and-raised portions 33A are bent (raised) toward the piston 4. Thus, the slit-and-raised portions 33A are formed by slitting the shim plate 31 along the circumferential direction of the disk 1, with the disk-circumferentially central portion 32A left unslit, and raising the slit regions of the shim plate 31 toward the piston 4.

Similarly, the lower part of the shim plate 31 (base plate member 32) is slit in a substantially U-shape rightward and leftward from the disk-circumferentially central portion 32A along the circumferential direction of the disk 1, with the central portion 32A left unslit, to form substantially U-shaped slits 34C symmetrically facing each other across the circumferentially central portion 32A. A region enclosed (surrounded) by each slit 34C forms a slit-and-raised portion 34A of the second pressing part 34. As shown in FIG. 10, the slit-and-raised portions 34A are bent (raised) toward the piston 4. Thus, the slit-and-raised portions 34A are formed by slitting the shim plate 31 along the circumferential direction of the disk 1, with the disk-circumferentially central portion 32A left unslit, and raising the slit regions of the shim plate 31 toward the piston 4.

The slit-and-raised portions 33A of the first pressing part 33 and the slit-and-raised portion 34A of the second pressing part 34 are regions pressed by the opening end of the piston 4 before the whole opening end (distal end) of the piston 4 abuts against the shim plate 31. When the slit-and-raised portions 33A and 34A are pressed by the opening end of the piston 4, the pressing force F of the piston 4 is transmitted to the friction pad 5 through the connecting portions 33B and 34B connecting together the proximal ends of the slit-and-raised portions 33A and 34A, respectively, at the disk-circumferentially central portion 32A of the shim plate 31.

The pressing parts 33 and 34 press the center in the disk circumferential direction of the friction pad 5 when the piston 4 starts to press the friction pad 5, more specifically, when the pressing force F of the piston 4 is in a low pressure range, e.g. a pressure range of not more than 0.8 MPa, more preferably not more than 0.5 MPa, in terms of fluid pressure. That is, when the pressing force F of the piston 4 is in the low pressure range, only the slit-and-raised portions 33A and 34A are pressed by the opening end of the piston 4. At this time, the connecting portions 33B and 34B between the slit-and-raised portions 33A and 34A press the friction pad 5 at two positions in the circumferential center of the friction pad 5 along the line segment X-X in the radial direction of the disk 1.

When the pressing force F of the piston 4 is in the low pressure range, the slit-and-raised portions 33A and 34A are elastically deformed toward the friction pad 5 as the pressing force F of the piston 4 increases. After the pressing force F of the piston 4 has exceeded the low pressure range, the slit-and-raised portions 33A and 34A are most deflected toward the friction pad 5 (most deflected state). Consequently, the slit-and-raised portions 33A and 34A and the connecting portions 33B and 34B become flush with each other. Thus, after the low pressure range has been exceeded, the whole of a region of the opening end of the piston 4 that faces the shim plate 31 in the axial direction of the disk 1 abuts against the shim plate 31 to press the friction pad 5 with the whole piston 4.

Consequently, when the pressing force F of the piston 4 is in the low pressure range, the pressing force F is transmitted to the friction pad 5 through the first and second pressing parts 33 and 34 at the center in the disk circumferential direction of the piston 4. After the pressing force F has exceeded the low pressure range, the range that exerts the pressing force F to the friction pad 5 extends in the disk circumferential direction. Consequently, the whole region in the disk circumferential direction of the piston 4 (i.e. the whole of a region of the opening end of the piston 4 that faces the shim plate 31 in the axial direction of the disk 1) transmits the pressing force F of the piston 4 to the friction pad 5.

When the pressing force F of the piston 4 is in the low pressure range, the friction pad 5 is pressed by the pressing parts 33 and 34 (connecting portions 33B and 34B) at two positions in the disk-circumferential center of the friction pad 5 along the line segment X-X in the radial direction of the disk 1. It should be noted that the line segment X-X corresponds to the node of axial primary bending moment of the friction pad 5, which is a vibration mode characteristic of brake noise during braking in the low pressure range, i.e. what is called low pressure brake noise. When the pressing force F is in the low pressure range, the friction pad 5 is pressed by the piston 4 through the pressing parts 33 and 34 (connecting portions 33B and 34B) at two positions along the line segment X-X corresponding to the node.

In other words, the pressing force F of the piston 4 is transmitted to the friction pad 5 through only the two positions along the line segment X-X corresponding to the node of vibration of the friction pad 5. Accordingly, it is possible to reduce vibration of the friction pad 5 that is transmitted to the caliper 3 through the piston 4 during braking in the low pressure range and hence possible to suppress low pressure brake noise stably.

The following is an explanation of an outer shim plate 35 provided between the outer friction pad 6 and the outer leg portion 3C of the caliper 3.

Figure 11:
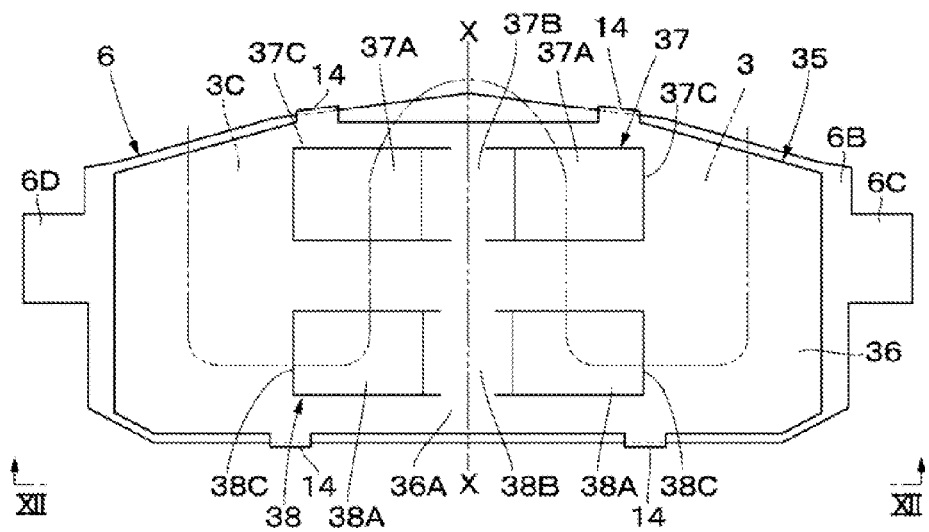
FIG. 11 is a front view of an outer friction pad and a shim plate as seen from the outer side (left-hand side in FIG. 1).
Figure 12:
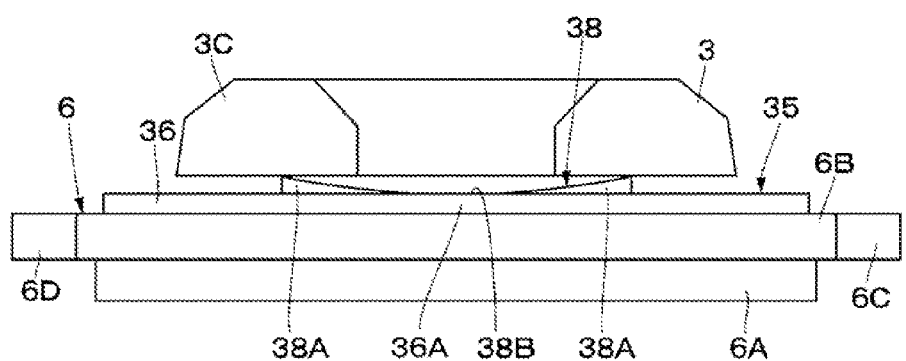
FIG. 12 is a bottom view as seen from the direction XII-XII in FIG. 11, showing an outer leg portion (claw portion) of a caliper, a friction pad, and a shim plate.

The outer shim plate 35 provided between the outer friction pad 6 and the outer leg portion 3C of the caliper 3, as shown in FIGS. 11 and 12, substantially comprises mounting claw portions 14 and a base plate member 36 (described later). The base plate member 36 is formed as a plate-shaped member having a substantially rectangular or substantially sectorial configuration, which extends in both the disk circumferential direction and the disk radial direction along the rear side of the outer friction pad 6 (backing plate 6B). The base plate member 36 is provided with a first pressing part 37 and second pressing part 38 which extend in the disk circumferential direction.

The first and second pressing parts 37 and 38 are provided as integral parts of the shim plate 35 (base plate member 36) in parallel to each other, being spaced in the disk radial direction. The pressing parts 37 and 38 are located between the outer leg portion 3C of the caliper 3 and the friction pad 6 when the friction pad 6 is attached to the mounting member 2, together with the shim plate 35.

The pressing parts 37 and 38 are formed by slitting and raising the base plate member 36, which constitutes the shim plate 35, in the circumferential direction of the disk 1, with a disk-circumferentially central portion 36A of the base plate member 36 left unslit. More specifically, each pressing part 37, 38 substantially comprises a pair of slit-and-raised portions 37A, 38A spaced from each other in the disk circumferential direction, and a connecting portion 37B, 38B located between the slit-and-raised portions 37A, 38A to connect therebetween.

Accordingly, the upper part of the base plate member 36 constituting the shim plate 35 is slit in a substantially U-shape rightward and leftward from the disk-circumferentially central portion 36A along the circumferential direction of the disk 1, with the central portion 36A left unslit, to form of substantially U-shaped slits 37C symmetrically facing each other across the circumferentially central portion 36A. A region enclosed (surrounded) by each slit 37C forms a slit-and-raised portion 37A of the first pressing part 37. As shown in FIG. 12, the slit-and-raised portions 37A are bent (raised) toward the outer leg portion 3C of the caliper 3. Thus, the slit-and-raised portions 37A are formed by slitting the shim plate 35 along the circumferential direction of the disk 1, with the disk-circumferentially central portion 36A left unslit, and raising the slit regions of the shim plate 35 toward the outer leg portion 3C of the caliper 3.

Similarly, the lower part of the shim plate 35 (base plate member 36) is slit in a substantially U-shape rightward and leftward from the disk-circumferentially central portion 36A along the circumferential direction of the disk 1, with the central portion 36A left unslit, to form substantially U-shaped slits 38C symmetrically facing each other across the disk-circumferentially central portion 36A. A region enclosed (surrounded) by each slit 38C forms a slit-and-raised portion 38A of the second pressing part 38. As shown in FIG. 12, the slit-and-raised portions 38A are bent (raised) toward the outer leg portion 3C of the caliper 3. Thus, the slit-and-raised portions 38A are formed by slitting the shim plate 35 along the circumferential direction of the disk 1, with the disk-circumferentially central portion 36A left unslit, and raising the slit regions of the shim plate 35 toward the outer leg portion 3C of the caliper 3.

It should be noted that the first and second pressing parts 37 and 38 of the outer shim plate 35 differ from the first and second pressing parts 33 and 34 of the inner shim plate 31 in that the first and second pressing parts 37 and 38 are equal to each other in length in the disk circumferential direction. That is, regarding the first and second pressing parts 33 and 34 of the inner shim plate 31, the first pressing part 33 is set longer than the second pressing part 34 in conformity to the abutting position with the opening end of the piston 4, whereas the first and second pressing parts 37 and 38 of the outer shim plate 35 are set to the same length in conformity to the abutting position with the outer leg portion 3C of the caliper 3.

The first and second pressing parts 37 and 38 of the outer shim plate 35 also differ from the first and second pressing parts 33 and 34 of the inner shim plate 31 in that the first and second pressing parts 37 and 38 are pressed by the outer leg portion 3C, whereas the first and second pressing parts 33 and 34 are pressed by the piston 4.

It should be noted, however, that the first and second pressing parts 37 and 38 of the outer shim plate 35 and the first and second pressing parts 33 and 34 of the inner shim plate 31 have substantially the same structure and advantageous effects, except the difference in terms of length and the difference as to whether the pressing parts are pressed by the piston 4 or by the outer leg portion 3C of the caliper 3. Therefore, further explanation is omitted of the first and second pressing parts 37 and 38 of the outer shim plate 35.

The disk brake according to this embodiment prevents brake noise by using the shim plates 31 and 35 arranged as stated above and has no particular difference in the basic operation from the disk brake according to the foregoing first embodiment.

In this embodiment, in particular, the friction pads 5 and 6 are pressed by the first pressing parts 33 and 37 and the second pressing parts 34 and 38, respectively, at two positions in the disk-circumferential center of each pad along the line segment X-X in the radial direction of the disk 1. Accordingly, in this embodiment also, it is possible to reduce vibration of the friction pads 5 and 6 that is transmitted to the caliper 3 through the piston 4 and the outer leg portion 3C during braking in the low pressure range and hence possible to suppress low pressure brake noise stably.

In this embodiment, the first pressing parts 33 and 37 and the second pressing parts 34 and 38 are formed by slitting and raising along the disk circumferential direction. Accordingly, the pressing parts 33, 37, 34 and 38 can be formed by a simple working process, e.g. press working, and costs can be reduced.

In this embodiment, the shim plate 31 having the pressing parts 33 and 34 is provided between the inner friction pad 5 and the piston 4, and the shim plate 35 having the pressing parts 37 and 38 is provided between the outer friction pad 6 and the outer leg portion 3C of the caliper 3. Therefore, it is possible to stably suppress both low pressure brake noise caused by the inner friction pad 5 and low pressure brake noise caused by the outer friction pad 6.

Figure 13:
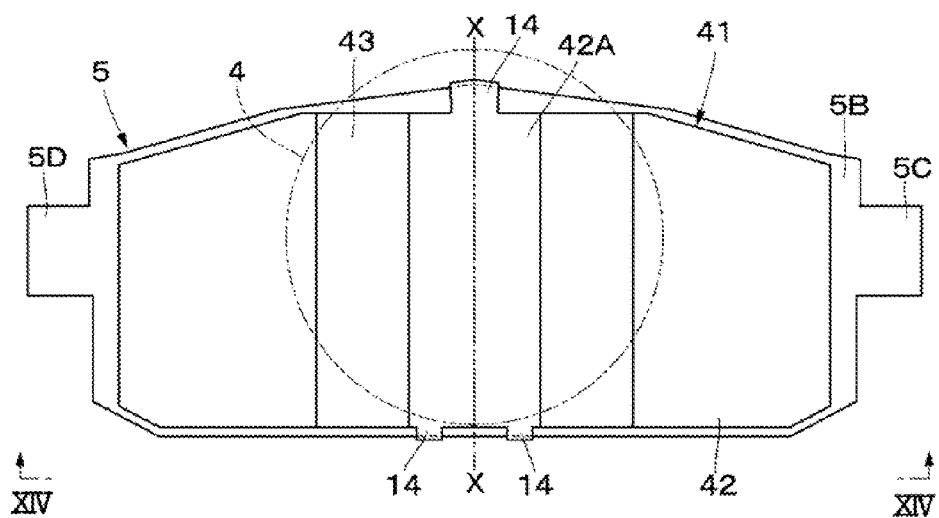
FIG. 13 is a front view similar to FIG. 3, showing an inner friction pad and a shim plate of a disk brake according to a fourth embodiment of the present invention.
Figure 14:
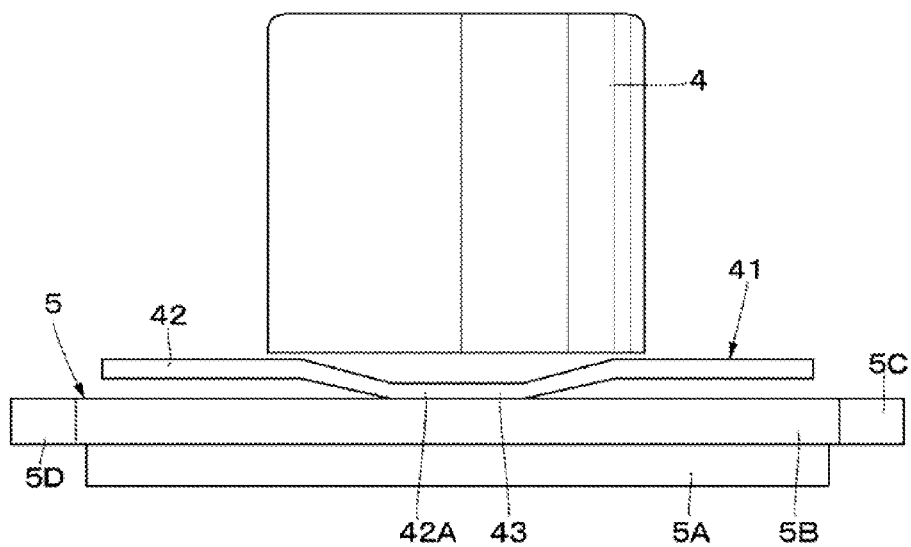
FIG. 14 is a bottom view as seen from the direction of the arrow XIV-XIV in FIG. 13, showing a piston, a friction pad, and a shim plate.

FIGS. 13 and 14 show a fourth embodiment of the present invention. The feature of this embodiment resides in that a pressing part is provided on a shim plate by forming the whole shim plate in a wavy shape (substantially U shape) along the disk circumferential direction. It should be noted that, in this embodiment, the same constituent elements as those of the foregoing first embodiment are denoted by the same reference numerals as used in the first embodiment, and a description thereof is omitted.

An inner shim plate 41 is provided between an inner friction pad 5 and a piston 4. The inner shim plate 41 substantially comprises mounting claw portions 14 and a base plate member 42 (described later). The base plate member 42 is formed as a plate-shaped member having a substantially rectangular or substantially sectorial configuration, which extends in both the disk circumferential direction and the disk radial direction along the rear side of the friction pad 5 (backing plate 5B). The base plate member 42 has a disk-circumferentially central portion 42A provided with a pressing part 43 extending in the disk radial direction. The pressing part 43 is provided as an integral part of the base plate member 42.

That is, the shim plate 41 is bent in a wavy shape, more specifically, in a substantially U-shape along the circumferential direction of the disk 1 so that the disk-circumferentially central portion 42A of the base plate member 42 projects toward the friction pad 5. The pressing part 43 is formed by the disk-circumferentially central portion 42A of the shim plate 41, which projects toward the friction pad 5.

The pressing part 43 presses the center in the disk circumferential direction of the friction pad 5 along the line segment X-X in the disk radial direction when the piston 4 starts to press the friction pad 5, i.e. when the pressing force F of the piston 4 is in a low pressure range, e.g. a pressure range of not more than 0.8 MPa, more preferably not more than 0.5 MPa, in terms of fluid pressure, in the same way as the foregoing first embodiment.

The disk brake according to this embodiment prevents brake noise by using the shim plate 41 arranged as stated above and has no particular difference in the basic operation from the disk brake according to the foregoing first embodiment.

In this embodiment, in particular, the pressing part 43 is formed by the disk-circumferentially central portion 42A of the shim plate 41 (base plate member 42) that projects toward the friction pad 5. Accordingly, the pressing part 43 can be formed by a simple working process, e.g. press working. Moreover, it is possible to omit a slitting process, a raising process, etc. which are required for a structure in which slit-and-raised portions are formed on a shim plate, for example, and hence possible to further reduce costs correspondingly.

Figure 15:
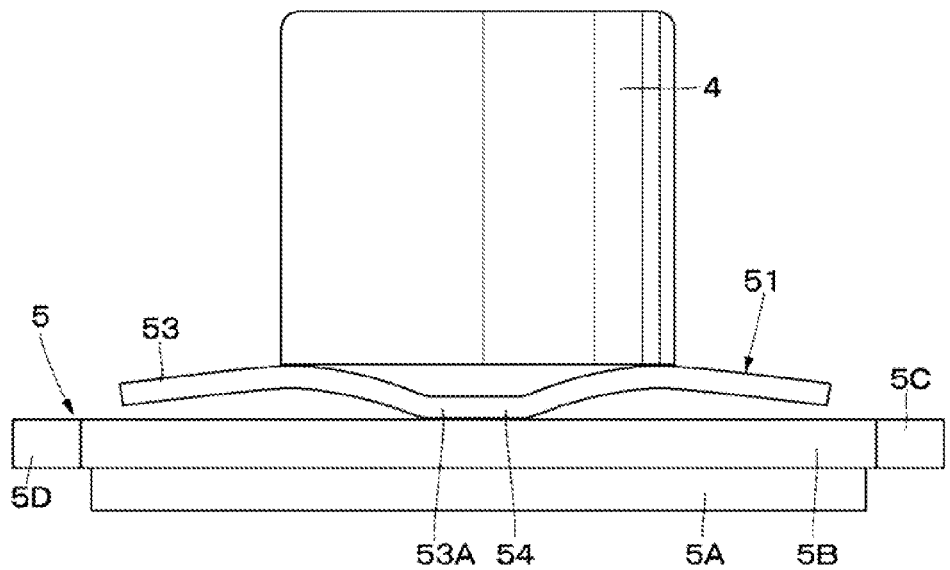
FIG. 15 is a bottom view similar to FIG. 10, showing a piston, a friction pad and a shim plate of a disk brake according to a fifth embodiment of the present invention.
Figure 16:
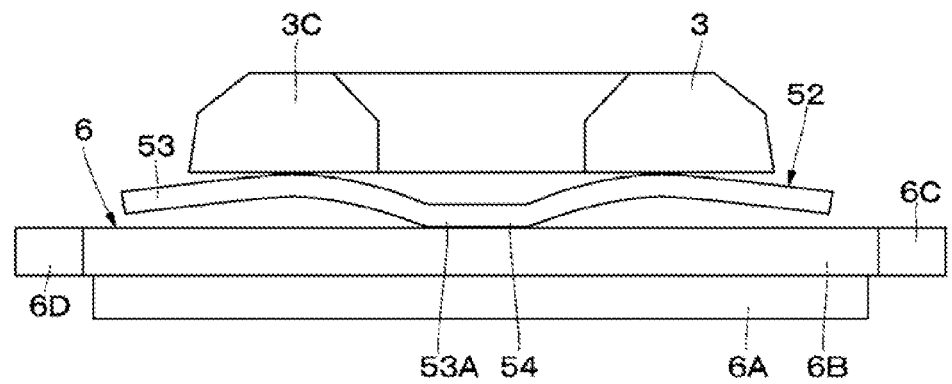
FIG. 16 is a bottom view similar to FIG. 12, showing an outer leg portion (claw portion) of a caliper, a friction pad, and a shim plate.

FIGS. 15 and 16 show a fifth embodiment of the present invention. The feature of this embodiment resides in that a pressing part is provided on a shim plate by forming the whole shim plate in a wavy shape (substantially M shape) along the disk circumferential direction, and that a shim plate is also provided between an outer friction pad and an outer leg portion of a caliper. It should be noted that, in this embodiment, the same constituent elements as those of the foregoing first embodiment are denoted by the same reference numerals as used in the first embodiment, and a description thereof is omitted.

An inner shim plate 51 is provided between an inner friction pad 5 and a piston 4. An outer shim plate 52 is provided between an outer friction pad 6 and an outer leg portion 3C of a caliper 3. The inner and outer shim plates 51 and 52 each substantially comprise a base plate member 53 and mounting claw portions (not shown). The base plate member 53 is formed as a plate-shaped member having a substantially rectangular or substantially sectorial configuration, which extends in both the disk circumferential direction and the disk radial direction along the rear side of the friction pad 5, 6 (backing plate 5B, 6B). The base plate member 53 has a disk-circumferentially central portion 53A provided with a pressing part 54 extending in the disk radial direction. The pressing part 54 is provided as an integral part of the base plate member 53.

That is, the shim plate 51, 52 is bent in a wavy shape, more specifically, in a substantially M- or W-shape along the disk circumferential direction so that the disk-circumferentially central portion 53A of the base plate member 53 projects toward the friction pad 5, 6. The pressing part 54 is formed by the disk-circumferentially central portion 53A of the shim plate 51, 52, which projects toward the friction pad 5, 6.

The pressing part 54 presses the disk-circumferential center of the friction pad 5, 6 along the line segment X-X in the disk radial direction when the piston 4 starts to press the friction pad 5, i.e. when the pressing force F of the piston 4 is in a low pressure range, e.g. a pressure range of not more than 0.8 MPa, more preferably not more than 0.5 MPa, in terms of fluid pressure.

The disk brake according to this embodiment prevents brake noise by using the shim plates 51 and 52 arranged as stated above and has no particular difference in the basic operation from the disk brake according to the foregoing first embodiment.

In this embodiment, in particular, the pressing part 54 is formed by the disk-circumferentially central portion 53A of the shim plate 51, 52 (base plate member 53) that projects toward the friction pad 5, 6. Accordingly, the pressing part 54 can be formed by a simple working process, e.g. press working. Moreover, it is possible to omit a slitting process, a raising process, etc. which are required for a structure in which slit-and-raised portions are formed on a shim plate, for example, and hence possible to further reduce costs correspondingly.

In this embodiment, the shim plate 51 having the pressing part 54 is provided between the inner friction pad 5 and the piston 4, and the shim plate 52 having the pressing part 54 is provided between the outer friction pad 6 and the outer leg portion 3C of the caliper 3. Therefore, it is possible to stably suppress both low pressure brake noise caused by the inner friction pad 5 and low pressure brake noise caused by the outer friction pad 6.

Figure 17:
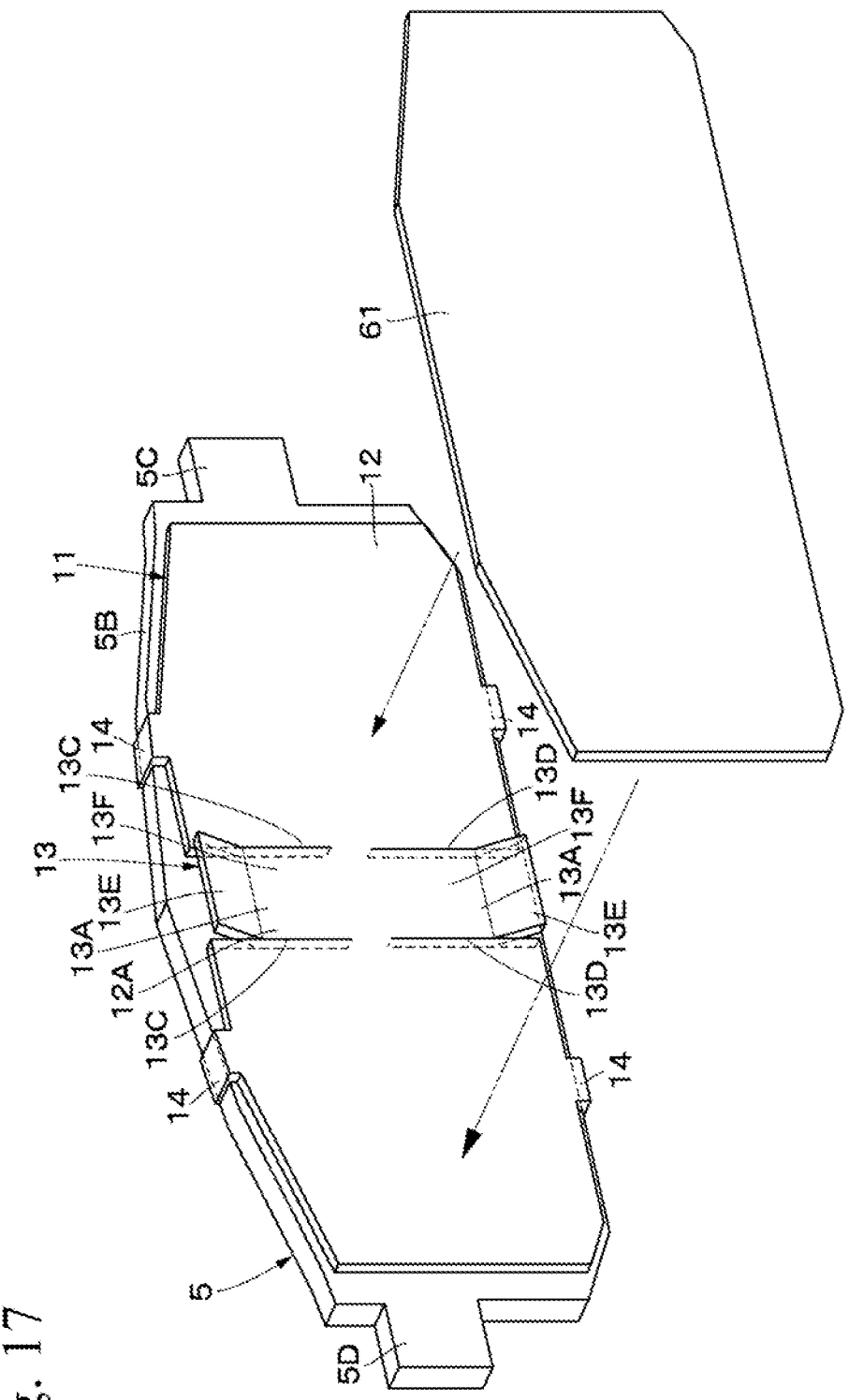
FIG. 17 is an exploded perspective view similar to FIG. 2, showing a friction pad, a shim plate and another shim plate of a disk brake according to a sixth embodiment of the present invention.
Figure 18:
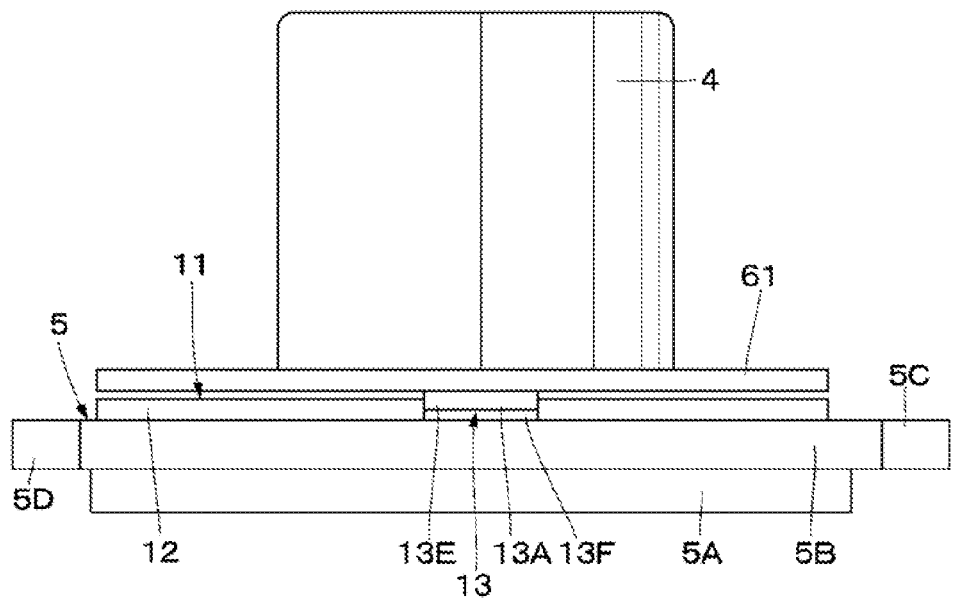
FIG. 18 is a bottom view similar to FIG. 10, showing a piston, a friction pad, a shim plate, and another shim plate.
Figure 19:
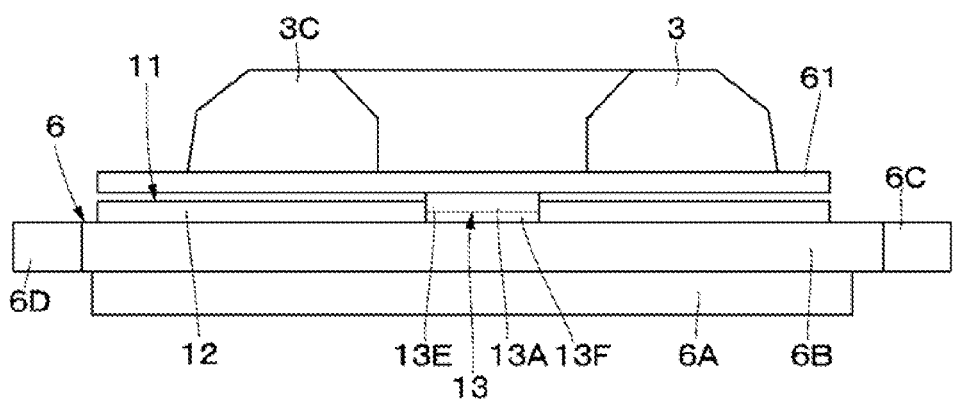
FIG. 19 is a bottom view similar to FIG. 12, showing an outer leg portion (claw portion) of a caliper, a friction pad, a shim plate, and another shim plate.

FIGS. 17 to 19 show a sixth embodiment of the present invention. The feature of this embodiment resides in that two shim plates, i.e. a shim plate having a pressing part and another shim plate, are provided between an inner friction pad and a piston, and a shim plate having a pressing part is also provided between an outer friction pad and an outer leg portion of a caliper. It should be noted that, in this embodiment, the same constituent elements as those of the foregoing first embodiment are denoted by the same reference numerals as used in the first embodiment, and a description thereof is omitted.

Between an inner friction pad 5 and a piston 4, a shim plate 11 is provided, which is substantially the same as the shim plate 11 of the foregoing first embodiment. In addition, another shim plate 61 is provided between the shim plate 11 and the piston 4. Between an outer friction pad 6 and an outer leg portion 3C of a caliper 3, a shim plate 11 having substantially the same structure as the shim plate 11 provided for the inner friction pad 5 is provided in place of the outer shim plate 15 of the foregoing first embodiment. In addition, another shim plate 61 is provided between the shim plate 11 and the outer leg portion 3C.

The shim plate 11 constitutes an inner shim plate, and the additional shim plate 61 constitutes an outer shim plate. The shim plate 61 is formed as a flat plate having the same configuration as the base plate member 12 of the shim plate 11. The shim plate 61 is not provided with a pressing part 13 and mounting claw portions 14 as provided on the shim plate 11. It should be noted that mounting claw portions may be provided on the peripheral edge of the shim plate 61, if necessary.

The disk brake according to this embodiment prevents brake noise by using the shim plates 11 and additional shim plates 61 arranged as stated above and has no particular difference in the basic operation from the disk brake according to the foregoing first embodiment.

In this embodiment, in particular, an additional shim plate 61 is provided at the rear side (side remote from the inner friction pad 5, 6) of each shim plate 11. Accordingly, the shim plate 11 having the slit-and-raised portions 13A provided at the disk-circumferentially central portion 12A can be provided also between the outer leg portion 3C, which has a forked claw portion at the distal end thereof, and the outer friction pad 6. Therefore, it is unnecessary to form (manufacture) a special-purpose shim plate fitted to the configuration of the outer leg portion 3C as a shim plate provided between the outer leg portion 3C and the outer friction pad 6, separately from the shim plate 11 for the inner friction pad 5. Accordingly, it is possible to commonize shim plates 11 with a pressing part 13 used for the inner and outer friction pads 5 and 6. Thus, costs can be reduced.

Moreover, shim plates 11 with a pressing part 13 are provided respectively between the inner friction pad 5 and the piston 4 and between the outer friction pad 6 and the outer leg portion 3C of the caliper 3. Therefore, it is possible to stably suppress both low pressure brake noise caused by the inner friction pad 5 and low pressure brake noise caused by the outer friction pad 6.

Figure 20:
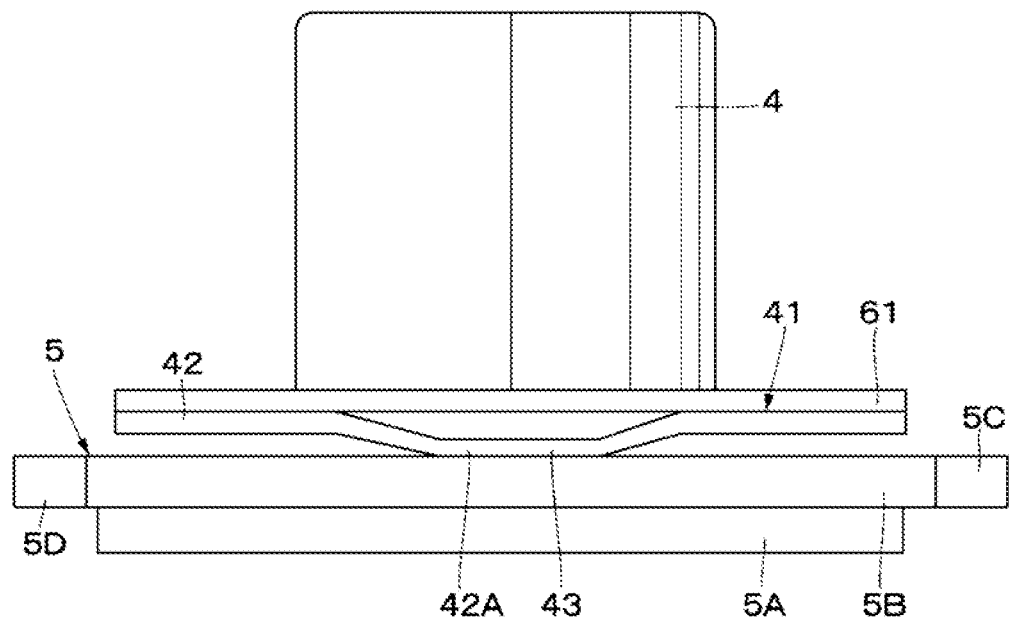
FIG. 20 is a bottom view similar to FIG. 10, showing a piston, a friction pad, a shim plate and another shim plate of a disk brake according to a modification of the present invention.

FIG. 20 shows a modification of the present invention. As shown in FIG. 20, the arrangement may be such that two shim plates, i.e. the shim plate 41 of the foregoing fourth embodiment and the additional shim plate 61 of the sixth embodiment, are provided between the inner friction pad 5 and the piston 4. That is, the additional shim plate 61 may be combined with a shim plate properly selected from among the shim plates 11, 31, 35, 41, 51 and 52 of the foregoing embodiments.

Figure 21:
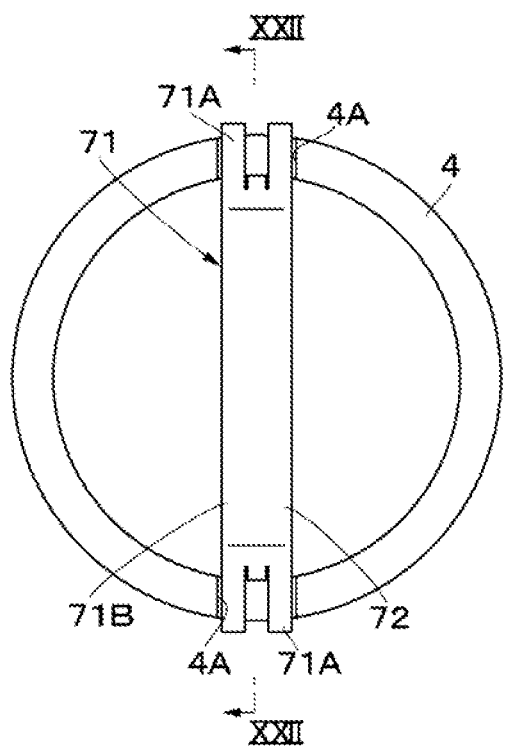
FIG. 21 is a front view of a piston and a pressing member of a disk brake according to a seventh embodiment of the present invention as seen from the outer side.
Figure 22:
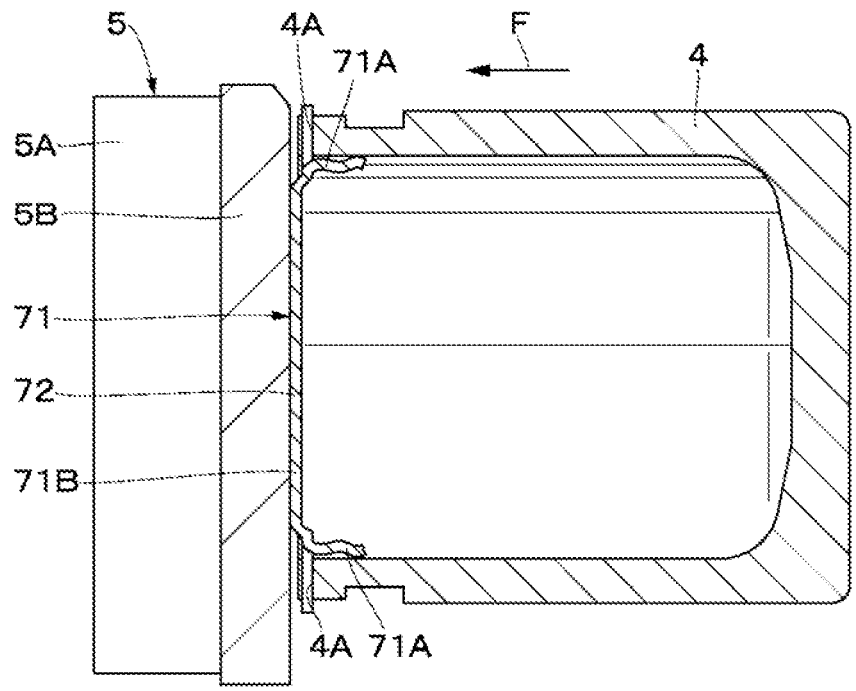
FIG. 22 is a sectional view as seen from the direction of the arrow XXII-XXII in FIG. 21, showing a piston, a pressing member, and a friction pad when the pressing force of the piston is in a low pressure range.
Figure 23:
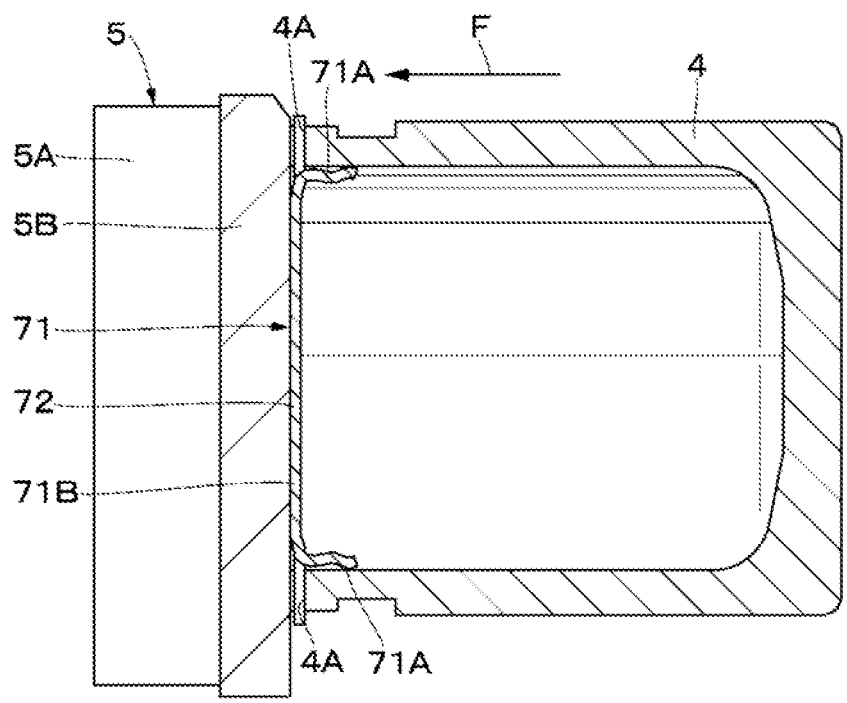
FIG. 23 is a sectional view similar to FIG. 22, showing the piston, the pressing member, and the friction pad after the pressing force of the piston has exceeded the low pressure range.

FIGS. 21 to 23 show a seventh embodiment of the present invention. The feature of this embodiment resides in that a pressing part (pressing mechanism) is formed by a member (pressing member) engaged with a piston. It should be noted that, in this embodiment, the same constituent elements as those of the foregoing first embodiment are denoted by the same reference numerals as used in the first embodiment, and a description thereof is omitted.

The opening end (distal end) of a piston 4 has engaging recesses 4A provided at diametrically opposed positions (180°-spaced positions). The engaging recesses 4A are recessed from the opening end of the piston 4 in the disk axial direction. A pressing member 71 as a pressing part is engaged (installed) in the engaging recesses 4A. The pressing member 71 is located between a friction pad 5 and the piston 4 to press the center in the disk circumferential direction of the friction pad 5 along the line segment X-X in the disk radial direction when the piston 4 starts to press the friction pad 5.

The pressing member 71 is formed, for example, by applying press working to a rectangular plate member, e.g. a resilient stainless steel plate. The pressing member 71 substantially comprises engaging portions 71A located at the opposite ends of the pressing member 71 in the longitudinal direction and engaged in the engaging recesses 4A, respectively, of the piston 4, and a connecting portion 71B connecting between the engaging portions 71A. An abutting part 72 is provided at the longitudinal center of the connecting portion 71B. The abutting part 72 projects from the opening end of the piston 4 toward the backing plate 5B of the friction pad 5 to abut against the backing plate 5B when the pressing member 71 is in a free state (not elastically deformed). The abutting part 72 faces the line segment X-X in the disk radial direction at the center in the disk circumferential direction of the friction pad 5 when the pressing member 71 is engaged (assembled) with the piston 4.

As shown in FIG. 22, when the pressing force F of the piston 4 is in a low pressure range, e.g. a pressure range of not more than 0.8 MPa, more preferably not more than 0.5 MPa, in terms of fluid pressure, only the abutting part 72 of the pressing member 71 presses the circumferential center of the friction pad 5 with a predetermined length along the line segment X-X in the disk radial direction. In addition, when the pressing force F of the piston 4 is in the low pressure range, the abutting part 72 is elastically deformed toward the bottom of the piston 4 as the pressing force F of the piston 4 increases.

After the pressing force F of the piston 4 has exceeded the low pressure range, as shown in FIG. 23, the abutting part 72 is most deflected toward the bottom of the piston 4 (most deflected state). Consequently, the abutting part 72 and the opening end (distal end) of the piston 4 become flush with each other. Thus, after the low pressure range has been exceeded, the whole of the opening end of the piston 4 (except the engaging recesses 4A) abuts against the friction pad 5 to press the friction pad 5 with the whole piston 4.

Consequently, when the pressing force F of the piston 4 is in the low pressure range, the pressing force F is transmitted to the friction pad 5 through the abutting part 72. After the pressing force F of the piston 4 has exceeded the low pressure range, the pressing force F is transmitted to the inner friction pad 5 through the whole disk-circumferential region of the piston 4, more specifically, through the whole of a region of the opening end of the piston 4, except the engaging recesses 4A, which faces the friction pad 5 in the axial direction of the disk 1.

The disk brake according to this embodiment prevents brake noise by using the pressing member 71 arranged as stated above and has no particular difference in the basic operation from the disk brake according to the foregoing first embodiment, except the difference that the friction pad 5 is pressed at a region thereof along the line segment X-X with the pressing member 71, which is a member separate from a shim plate.

In this embodiment, in particular, a pressing part is formed by the pressing member 71 engaged with the piston 4. In other words, a pressing part (pressing mechanism) is formed by the pressing member 71, which is a member separate from a shim plate. Accordingly, even with a structure in which no shim plate is provided at the rear of the friction pad 5, it is possible to reduce vibration of the friction pad 5 that is transmitted to the caliper 3 through the piston 4 during braking in the low pressure range and hence possible to suppress low pressure brake noise stably.

It should be noted that, in the foregoing first embodiment, the pressing part 13 is formed by slitting portions (at the opposite ends in the disk radial direction) of the disk-circumferentially central portion 12A of the shim plate 11 and raising the slit portions toward the piston 4, by way of example. The present invention, however, is not limited thereto. For example, a pressing part may be formed by slitting a portion of the disk-circumferentially central portion of the shim plate (e.g. a middle portion in the disk radial direction of the shim plate) and raising the slit portion toward the friction pad.

In the foregoing third embodiment, the pair of pressing parts 33, 34 and the pair of pressing parts 37, 38 press the friction pads 5 and 6, respectively, at two positions in the center in the disk circumferential direction thereof along the line segment X-X in the disk radial direction, by way of example. The present invention, however, is not limited to the above-described structure. For example, three or more pressing parts may be provided to press a friction pad at three or more positions in the center in the disk circumferential direction thereof along a line segment in the disk radial direction.

In the foregoing embodiments, the present invention has been explained in regard to a floating caliper type disk brake, by way of example, in which the piston 4 is slidably provided in the inner leg portion 3A of the caliper 3 through the cylinder 3D, and the outer leg portion 3C of the caliper 3 is abutted against the outer friction pad 6. The present invention, however, is not limited thereto. For example, the present invention is also applicable to an opposed-piston type disk brake having pistons provided on the inner and outer sides, respectively, of a caliper.

In the foregoing embodiments, a pressing part (pressing mechanism) is provided between a piston and a friction pad, which pressing part presses the center in the disk circumferential direction of the friction pad along a line segment in the disk radial direction. When the piston starts to press the friction pad, the pressing part transmits pressing force of the piston to the friction pad. Accordingly, during braking in a low pressure range in which the pressing force of the piston is very low, the friction pad is pressed by the pressing part at a region of the friction pad along a line segment corresponding to the node of axial primary bending moment of the friction pad, which is a vibration mode characteristic of low pressure brake noise. Thus, it is possible to reduce vibration of the friction pad that is transmitted to the caliper through the piston during braking in the low pressure range and hence possible to suppress low pressure brake noise stably.

Moreover, the pressing part can be made less susceptible to the influence of deterioration with time than grease or rubber stacked on the shim plate. In other words, the pressing part can be made resistant to deterioration with time. Therefore, it is possible to suppress low pressure brake noise stably despite a long time use. In addition, because the pressing part presses the center in the disk circumferential direction of the friction pad, low pressure brake noise can be suppressed stably throughout the time from when the friction pad is brand-new until the time to replace it with a new one irrespective of how worn the lining of the friction pad is.

According to one embodiment, the friction pad is pressed at at least two positions in the center in the disk circumferential direction of the friction pad along the line segment in disk radial direction. Accordingly, it is possible to reduce vibration of the friction pad that is transmitted to the caliper through the piston and the outer leg portion during braking in the low pressure range and hence possible to suppress low pressure brake noise stably.

According to one embodiment, the pressing part (pressing mechanism) is provided as an integral part of the shim plate. Accordingly, it is possible to form the pressing part easily by press working, for example, and, at the same time as the operation of forming the shim plate, for example. Therefore, costs can be reduced as compared to the structure in which the shim plate is coated with grease, or the structure that uses a stacked shim plate.

According to one embodiment, the pressing part is formed by slitting and raising a central portion in the disk circumferential direction of the shim plate along the disk radial direction. Accordingly, the pressing part can be formed by a simple working process, e.g. press working. Therefore, costs can be reduced also from this point of view.

According to one embodiment, the width of the slit-and-raised portions is set at not more than ½ of the width of the shim plate in the disk circumferential direction. Accordingly, the pressing part can press the central portion in the disk circumferential direction of the friction pad with a predetermined area along the line segment. Therefore, low pressure brake noise can be suppressed stably also from this point of view.

According to one embodiment, pressing parts are formed by slitting and raising a shim plate along the disk circumferential direction, with a central portion in the disk circumferential direction of the shim plate left unslit. Accordingly, the pressing parts can be formed by a simple working process, e.g. press working, and costs can be reduced.

According to one embodiment, a pressing part is formed by a central portion in the disk circumferential direction of a shim plate that projects toward a friction pad. Accordingly, the pressing part can be formed by a simple working process, e.g. press working. Moreover, it is possible to omit a slitting process, a raising process, etc. which are required for a structure in which slit-and-raised portions are formed on a shim plate, for example, and hence possible to further reduce costs correspondingly.

According to one embodiment, a pressing part (pressing mechanism) is provided on a member engaged with a piston. Accordingly, even with a structure in which no shim plate is provided at the rear of a friction pad, it is possible to reduce vibration of the friction pad that is transmitted to the caliper through the piston during braking in the low pressure range and hence possible to suppress low pressure brake noise stably.

According to one embodiment, pressing force F of the piston is transmitted to the friction pad through the pressing part when the pressing force F is in a low pressure range, e.g. a pressure range of not more than 0.8 MPa, more preferably not more than 0.5 MPa, in terms of fluid pressure. Accordingly, low pressure brake noise can be suppressed stably when the brakes are applied to an extent at which the friction pad starts to contact the disk, i.e. during braking in a low pressure range reached when the driver places his or her foot on the brake pedal just lightly.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2011-146793, filed on Jun. 30, 2011. The entire disclosure of Japanese Patent Applications No. 2011-146793, filed on Jun. 30, 2011 including specification, claims, drawings and summary is incorporated herein by reference in its entirety.

What is claimed is:

1. A disk brake comprising:
    a caliper disposed to extend over an outer periphery of a disk in a disk axial direction, the disk being rotatable relative to a stationary part of a vehicle;
    a piston provided at at least one side of the caliper in the disk axial direction;
    a pair of friction pads that are pressed against both sides of the disk by the piston; and
    a pressing mechanism provided between the piston and a friction pad of the pair of friction pads that is disposed between the piston and the disk, the pressing mechanism pressing the friction pad at a center in a disk circumferential direction of the piston when the piston starts to press the friction pad;
    wherein the pressing mechanism presses the center in the disk circumferential direction of the friction pad at at least two positions along a line segment in the disk radial direction, and
    wherein, when pressing force of the piston is in a low pressure range, the pressing force of the piston is transmitted to the friction pad through the pressing mechanism, and after the pressing force of the piston has exceeded the low pressure range, the pressing force of the piston is transmitted to the friction pad through a whole region in the disk circumferential direction of the piston.

2. The disk brake of claim 1, wherein a shim plate is provided between the friction pad and the piston, the pressing mechanism being provided as an integral part of the shim plate.

3. The disk brake of claim 2, wherein the pressing mechanism is formed by slitting and raising a central portion in the disk circumferential direction of the shim plate along the disk radial direction.

4. The disk brake of claim 3, wherein a width of the central portion slit and raised is set at not more than ½ of a width of the shim plate in the disk circumferential direction.

5. The disk brake of claim 1, wherein the pressing force of the piston is transmitted to the friction pad through the pressing mechanism when the pressing force is in the low pressure range of not more than 0.8 MPa in terms of fluid pressure.

6. A disk brake comprising:
a caliper disposed to extend over an outer periphery of a disk;
at least one piston provided in the caliper;
at least one pair of friction pads that are pressed against the disk by the piston; and
a shim plate provided between the piston and a friction pad of the at least one pair of friction pads that is disposed between the piston and the disk, the shim plate having a pressing mechanism that presses the friction pad at a center in a disk circumferential direction of the piston at least when the piston starts to press the friction pad;
wherein the pressing mechanism presses the friction pad, at the center in the disk circumferential direction of the friction pad, along a line segment in a disk radial direction, and
wherein, when pressing force of the piston is in a low pressure range, the shim plate transmits the pressing force of the piston to the friction pad through the pressing mechanism, and after the pressing force of the piston has exceeded the low pressure range, the shim plate transmits the pressing force of the piston to the friction pad through a whole area of the shim plate that is abutted by the piston.

7. The disk brake of claim 6, wherein the pressing mechanism presses a center in the disk circumferential direction of the friction pad at at least two positions along a line segment in a disk radial direction.

8. The disk brake of claim 6, wherein the pressing mechanism is formed by slitting and raising a central portion in the disk circumferential direction of the shim plate along a disk radial direction.

9. The disk brake of claim 8, wherein a width of the central portion slit and raised is set at not more than ½ of a width of the shim plate in the disk circumferential direction.

10. A disk brake comprising:
a caliper disposed to extend over an outer periphery of a disk;
at least one piston provided in the caliper;
at least one pair of friction pads that are pressed against the disk by the piston; and
a shim plate provided between the piston and a friction pad of the at least one pair of friction pads that is disposed between the piston and the disk, the shim plate having a pressing mechanism that presses a center in a disk circumferential direction of the friction pad at at least two positions along a line segment in a disk radial direction;
the pressing mechanism having a pressing part for pressing the friction pad at a center in the disk circumferential direction of the piston at least when the piston starts to press the friction pad;
wherein the pressing mechanism is configured to press the center in the disk circumferential direction of the friction pad along the line segment in a disk radial direction,
wherein, when pressing force of the piston is in a low pressure range, the pressing mechanism transmits the pressing force to the friction pad through the pressing part without a remaining part of the shim plate, other than the pressing part, being abutted by the piston, and after the pressing force has exceeded the low pressure range, the pressing mechanism transmits the pressing force of the piston to the friction pad through a whole area of the shim plate that is abutted by the piston, together with the remaining part of the shim plate.

11. The disk brake of claim 10, wherein the pressing part is formed by slitting and raising a central portion in the disk circumferential direction of the shim plate along the disk radial direction.

12. The disk brake of claim 11, wherein a width of the pressing part is set at not more than ½ of a width of the shim plate in the disk circumferential direction.

13. The disk brake of claim 10, wherein the shim plate has a plurality of pressing parts that are pressed by the piston, the pressing parts being formed by slitting the shim plate along the disk circumferential direction, with a central portion in the disk circumferential direction of the shim plate left unslit, and raising slit parts of the shim plate toward the piston, the pressing mechanism pressing the friction pad by the central portion left unslit between the pressing parts, when the piston starts to press the friction pad.

* * * * *